(12) United States Patent
Sato et al.

(10) Patent No.: US 11,544,355 B2
(45) Date of Patent: Jan. 3, 2023

(54) RESOURCE MANAGEMENT SERVER, CONTROL METHOD, AND NON-TRANSITORY STORAGE MEDIUM

(71) Applicant: SHARP KABUSHIKI KAISHA, Sakai (JP)

(72) Inventors: Kazuki Sato, Sakai (JP); Takayoshi Ohkohchi, Sakai (JP); Makoto Okumura, Sakai (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 180 days.

(21) Appl. No.: 16/945,032

(22) Filed: Jul. 31, 2020

(65) Prior Publication Data

US 2021/0034716 A1 Feb. 4, 2021

(30) Foreign Application Priority Data

Jul. 31, 2019 (JP) .............................. JP2019-141410

(51) Int. Cl.
*G06Q 20/00* (2012.01)
*G06F 21/10* (2013.01)
*G06Q 10/06* (2012.01)

(52) U.S. Cl.
CPC ....... *G06F 21/105* (2013.01); *G06Q 10/0631* (2013.01); *G06F 2221/0759* (2013.01)

(58) Field of Classification Search
CPC .......... G06F 21/105; G06F 2221/0759; G06Q 10/0631
USPC .................. 705/16, 21, 59; 380/44, 262, 278
See application file for complete search history.

(56) References Cited

U.S. PATENT DOCUMENTS

| | | | | |
|---|---|---|---|---|
| 2001/0013024 A1* | 8/2001 | Takahashi | ............... | G06F 21/10 705/59 |
| 2007/0162977 A1* | 7/2007 | Kuo | ................. | H04N 21/44204 726/26 |
| 2012/0079601 A1* | 3/2012 | Gava | ....................... | G06F 21/10 726/26 |

FOREIGN PATENT DOCUMENTS

JP 2018-107484 A 7/2018

* cited by examiner

*Primary Examiner* — Dante Ravetti
(74) *Attorney, Agent, or Firm* — ScienBiziP, P.C.

(57) ABSTRACT

A resource management server including a controller, a communicator that communicates with a license management server which manages a license, and a storage. The storage stores resource information. The controller acquires information about a resource to be activated, acquires license information from the license management server via the communicator, and, when a plurality of sets of license information is acquired as the license information, allocates a license to the resource to be activated based on the plurality of sets of license information.

13 Claims, 32 Drawing Sheets

FIG. 3

| RESOURCE ID | ATTRIBUTE | | | LICENSE ID |
| --- | --- | --- | --- | --- |
| | CONFERENCE ROOM NAME | LOCATION | DEVICE | |
| R1 | A-Room | AAA BUILDING 12TH FLOOR | ELECTRONIC WHITEBOARD | L1 |
| R2 | B-Room | AAA BUILDING 12TH FLOOR | ELECTRONIC WHITEBOARD SMART SPEAKER | L1 |
| R3 | Room-111 | BBB BUILDING 2ND FLOOR | - | L1 |
| R4 | Room-112 | BBB BUILDING 2ND FLOOR | - | L2 |
| R5 | Space-A | CCC BUILDING | SMART SPEAKER | - |
| ⋮ | ⋮ | ⋮ | ⋮ | ⋮ |

FIG. 4

| LICENSE ID | ATTRIBUTE | | |
|---|---|---|---|
| | NUMBER OF LICENSES | EXPIRATION DATE | PURCHASE DATE |
| L1 | 3 | JUNE 3, 2020 | JUNE 3, 2017 |
| L2 | 2 | MARCH 31, 2020 | MARCH 31, 2017 |
| L3 | 5 | DECEMBER 31, 2019 | DECEMBER 31, 2016 |
| ⋮ | ⋮ | ⋮ | ⋮ |

FIG. 16

| RESOURCE ID | ATTRIBUTE | | | LICENSE ID |
|---|---|---|---|---|
| | CONFERENCE ROOM NAME | LOCATION | CONFERENCE FUNCTION | |
| R1 | A-Room | AAA BUILDING 12TH FLOOR | VIDEO CONFERENCING FUNCTION VOICE CONFERENCING FUNCTION | L2 |
| R2 | B-Room | AAA BUILDING 12TH FLOOR | VOICE OPERATION FUNCTION | L1 |
| R3 | Room-111 | BBB BUILDING 2ND FLOOR | - | L3 |
| R4 | Room-112 | BBB BUILDING 2ND FLOOR | VOICE OPERATION FUNCTION | L2 |
| R5 | Space-A | CCC BUILDING | - | - |
| ⋮ | ⋮ | ⋮ | ⋮ | ⋮ |

FIG. 17

| LICENSE ID | NUMBER OF LICENSES | NUMBER OF AVAILABLE CONFERENCE FUNCTIONS | EXPIRATION DATE |
|---|---|---|---|
| L1 | 2 | 2 | JUNE 3, 2020 |
| L2 | 1 | UNLIMITED | MARCH 31, 2020 |
| L3 | 5 | 0 | DECEMBER 31, 2019 |
| ⋮ | ⋮ | ⋮ | ⋮ |

FIG. 19

| LICENSE ID | NUMBER OF LICENSES | AVAILABLE CONFERENCE FUNCTIONS ||||  EXPIRATION DATE |
|---|---|---|---|---|---|---|
| | | VOICE OPERATION FUNCTION | VIDEO CONFERENCING FUNCTION | VOICE CONFERENCING FUNCTION | DEVICE CASTING FUNCTION | |
| L1 | 2 | NOT AVAILABLE | AVAILABLE | AVAILABLE | NOT AVAILABLE | JUNE 3, 2020 |
| L2 | 2 | AVAILABLE | NOT AVAILABLE | NOT AVAILABLE | NOT AVAILABLE | MARCH 31, 2020 |
| L3 | 5 | NOT AVAILABLE | NOT AVAILABLE | NOT AVAILABLE | NOT AVAILABLE | DECEMBER 31, 2019 |
| ⋮ | ⋮ | ⋮ | ⋮ | ⋮ | ⋮ | ⋮ |

FIG. 21

| RESOURCE ID | ATTRIBUTE | | | ALLOCATED LICENSE ID |
|---|---|---|---|---|
| | CONFERENCE ROOM NAME | LOCATION | MAXIMUM CAPACITY | |
| R1 | A-Room | AAA BUILDING 12TH FLOOR | 30 PEOPLE | L2 |
| R2 | B-Room | AAA BUILDING 12TH FLOOR | 50 PEOPLE | L1 |
| R3 | Room-111 | BBB BUILDING 2ND FLOOR | 20 PEOPLE | L3 |
| R4 | Room-112 | BBB BUILDING 2ND FLOOR | 15 PEOPLE | L3 |
| R5 | Space-A | CCC BUILDING | 30 PEOPLE | - |
| ⋮ | ⋮ | ⋮ | ⋮ | ⋮ |

FIG. 22

| LICENSE ID | NUMBER OF LICENSES | MAXIMUM NUMBER OF PARTICIPANTS | EXPIRATION DATE |
|---|---|---|---|
| L1 | 3 | UP TO 50 PEOPLE | JUNE 3, 2020 |
| L2 | 2 | UP TO 30 PEOPLE | MARCH 31, 2020 |
| L3 | 5 | UP TO 20 PEOPLE | DECEMBER 31, 2019 |
| ⋮ | ⋮ | ⋮ | ⋮ |

FIG. 25

| LICENSE ID | NUMBER OF LICENSES | FEE STRUCTURE | EXPIRATION DATE |
|---|---|---|---|
| L1 | 3 | VARIABLE RATE (9,000 YEN PER HOUR) | JUNE 3, 2020 |
| L2 | 2 | FIXED RATE (120,000 YEN PER MONTH) | MARCH 31, 2020 |
| L3 | 5 | VARIABLE RATE (7,000 YEN PER HOUR) | DECEMBER 31, 2019 |
| ⋮ | ⋮ | ⋮ | ⋮ |

FIG. 26

| RESOURCE ID | PREVIOUS USAGE PERIOD | PREVIOUS USAGE DURATION | CUMULATIVE USAGE FREQUENCY | CUMULATIVE USAGE DURATION | CUMULATIVE AGGREGATION PERIOD |
|---|---|---|---|---|---|
| R1 | JULY 2, 2019 13:00~15:00 | 2 HOURS | 3 TIMES | 6 HOURS | JULY 1, 2019~ JULY 31, 2019 |
| R2 | JULY 2, 2019 11:00~14:00 | 3 HOURS | 1 TIME | 3 HOURS | JULY 1, 2019~ JULY 31, 2019 |
| R3 | JULY 3, 2019 10:00~12:00 | 2 HOURS | 1 TIME | 2 HOURS | JULY 1, 2019~ JULY 31, 2019 |
| ⋮ | ⋮ | ⋮ | ⋮ | ⋮ | ⋮ |

FIG. 28

| RESOURCE ID | ATTRIBUTE | | | DISPLAY ORDER | LICENSE ID |
|---|---|---|---|---|---|
| | CONFERENCE ROOM NAME | LOCATION | DEVICE | | |
| R1 | A-Room | AAA BUILDING 12TH FLOOR | ELECTRONIC WHITEBOARD | 1 | L1 |
| R2 | B-Room | AAA BUILDING 12TH FLOOR | ELECTRONIC WHITEBOARD SMART SPEAKER | 2 | L1 |
| R3 | Room-111 | BBB BUILDING 2ND FLOOR | - | 3 | L1 |
| R4 | Room-112 | BBB BUILDING 2ND FLOOR | - | 4 | L2 |
| R5 | Space-A | CCC BUILDING | SMART SPEAKER | 5 | - |
| ⋮ | ⋮ | ⋮ | ⋮ | ⋮ | ⋮ |

FIG. 32A

Room Management Portal — W610

Workspaces
5 Total Workspace(s)   4 Total License(s)

| License | Workspace | Location | Devices | Actions |
|---|---|---|---|---|
| Active | A-Room | AAA BUILDING 12TH FLOOR | 📺 | ⋮ |
| Active | B-Room | AAA BUILDING 12TH FLOOR | 📺📱 | ⋮ |
| Active | Room-111 | BBB BUILDING 2ND FLOOR | | ⋮ |
| Inactive | Space-A | CCC BUILDING | 📺 | ⋮ |
| Active | Room-112 | BBB BUILDING 2ND FLOOR | | ⋮ |

Room Management Portal — W620

Workspaces
5 Total Workspace(s)   4 Total License(s)

| License | Workspace | Location | Devices | Actions |
|---|---|---|---|---|
| Active | A-Room | AAA BUILDING 12TH FLOOR | 📺 | ⋮ |
| Active | B-Room | AAA BUILDING 12TH FLOOR | 📺📱 | ⋮ |
| Active | Room-111 | BBB BUILDING 2ND FLOOR | | ⋮ |
| Active | Space-A | CCC BUILDING | 📺 | ⋮ |
| Inactive | Room-112 | BBB BUILDING 2ND FLOOR | | ⋮ |

1-5 of 5

RESOURCE MANAGEMENT SERVER, CONTROL METHOD, AND NON-TRANSITORY STORAGE MEDIUM

BACKGROUND OF THE INVENTION

Field of the Invention

The present invention relates to a resource management server and the like.

Description of the Background Art

In recent years, a subscription model is sometimes adopted as a usage agreement (license) model for apps (applications) and devices. In a subscription model agreement, a license is managed for each user of the app. Further, devices are managed such that, for example, a license (usage permission) is managed for the devices placed in each room.

As a technique for managing the devices placed in each room, for example, proposed is a technique in which a data server centrally manages the identification information relating to a plurality of connected information processing devices (for example, see Japanese Unexamined Patent Application Publication No. 2018-107484).

Problems to be Solved by the Invention

However, the technique disclosed in Patent Document 1 is a technique for centrally managing identification information relating to a plurality of connected information processing devices, and is not a technique for managing device licenses. Therefore, each time there is a change in the number of devices, the administrator of the licenses needs to change the content of the license agreement or the allocation of the licenses. Specifically, it is necessary for the administrator to appropriately activate the resources, such that when a device is newly installed, the installed device is granted with a license, and when a device is removed, the removed device is no longer allocated the license. At this time, the administrator is required to go to the trouble of selecting an appropriate license based on the content of the license, and grant the license to the resource.

In view of the problems described above, the present invention has an object of providing a resource management server and the like that are capable of appropriately allocating a license to a resource based on license information.

SUMMARY OF THE INVENTION

Means for Solving the Problem

In order to solve the problems described above, a resource management server according to the present invention includes: a controller; a communicator that communicates with a license management server which manages a license; and a storage; wherein the storage stores resource information, and the controller acquires information about a resource to be activated, acquires license information from the license management server via the communicator, and when acquiring a plurality of sets of license information as the license information, allocates a license to the resource to be activated based on the plurality of sets of license information.

A control method according to the present invention is a control method of a resource management server including a controller, a communicator that communicates with a license management server which manages a license, and a storage that stores resource information, the method including: acquiring information about a resource to be activated; acquiring license information from the license management server via the communicator; and, when acquiring a plurality of sets of license information as the license information, allocating a license to the resource to be activated based on the plurality of sets of license information.

A non-transitory storage medium according to the present invention is a non-transitory storage medium storing a program that is readable by a computer of a resource management server including a controller, a communicator that communicates with a license management server which manages a license, and a storage that stores resource information, wherein the program causes the computer to: acquire information about a resource to be activated; acquire license information from the license management server via the communicator; and, when acquiring a plurality of sets of license information as the license information, allocate a license to the resource to be activated based on the plurality of sets of license information.

Effects of the Invention

According to the present invention, it is possible to appropriately allocate a license to a resource based on license information.

BRIEF DESCRIPTION OF THE DRAWINGS

FIG. 3 is a diagram showing a data configuration example of resource information according to the first embodiment.

FIG. 4 is a diagram showing a data configuration example of license information according to the first embodiment.

FIG. 16 is a diagram showing a data configuration example of resource information in a second embodiment.

FIG. 17 is a diagram showing a data configuration example of license information in the second embodiment.

FIG. 19 is a diagram showing another example of a data configuration of license information in the second embodiment.

FIG. 21 is a diagram showing a data configuration example of resource information in a third embodiment.

FIG. 22 is a diagram showing a data configuration example of license information in the third embodiment.

FIG. 25 is a diagram showing a data configuration example of license information in the fourth embodiment.

FIG. 26 is a diagram showing a data configuration example of usage record information in the fourth embodiment.

FIG. 28 is a flow diagram for describing the flow of resource addition processing in a sixth embodiment.

FIG. 32A is a diagram showing an operation example in the sixth embodiment.

FIG. 32B is a diagram showing an operation example in the sixth embodiment

DESCRIPTION OF THE PREFERRED EMBODIMENTS

1. First Embodiment

1.1 Overall Configuration

Figure 1:
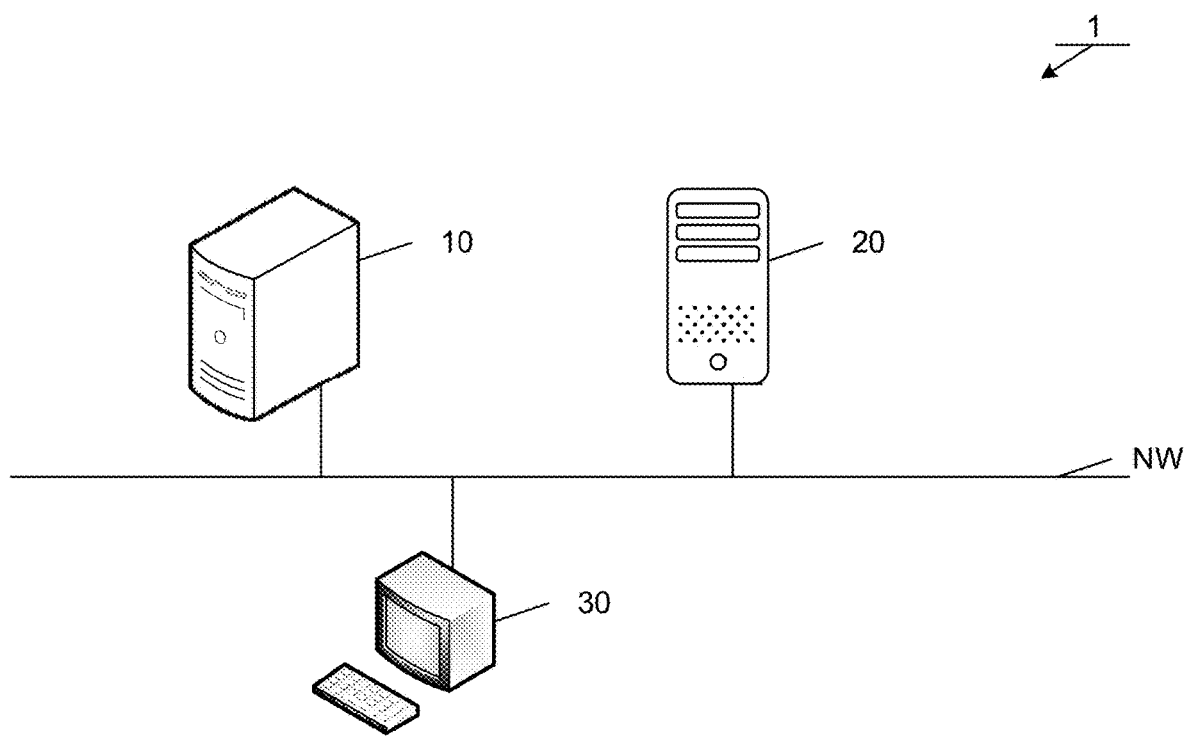
FIG. 1 is a diagram for describing an overall configuration of a resource management system according to a first embodiment.

FIG. 1 is a diagram showing an overall configuration of a resource management system (hereinafter simply referred to as "system 1") according to the present embodiment. As shown in FIG. 1, in the system 1, a resource management server 10, a license management server 20, and a management terminal device 30 are connected via a network NW. The network NW is, for example, a local area network (LAN). The network NW may also be a network such as the Internet.

The system 1 is a system that manages resources. Here, a resource is the name given to a unit managed by the system 1, and conceptually includes, for example, hardware, software, and users managed by the system 1. Hereinafter, the present embodiment will be described using a "conference room" as an example of a resource. In general, a "conference room" conceptually refers to a location in which conferences, appointments, and meetings are held (a conference space). Here, the resource may also refer to a terminal device inside the conference room, or a terminal device used by the user hosting the conference. Furthermore, a conference room represents a unit location in which a conference is held. In addition to general conference rooms, this includes not only facilities such as classrooms and meeting spaces where a plurality of people gather, but also spaces such as the homes of remote workers. In addition, the conference room may include locations around the location where the conference is held (such as a corridor).

Moreover, the system 1 manages one or more resources. For example, the system 1 manages resources for each administrator, business operator, tenant, or manager. For example, when a certain tenant has five conference rooms, the system 1 manages five resources.

The resource management server 10 is an information processing device that manages the resources. For example, the resource management server 10 is configured by a computer such as a server.

The license management server 20 is an information processing device that manages the usage agreements (licenses) of the resources. For example, the license management server 20 is configured by a computer such as a server.

The management terminal device 30 is a device used by the user to manage resources/licenses. For example, the management terminal device 30 is configured by an information processing device such as a personal computer (PC).

Note that the configuration described above is an example, and the configuration may be changed as appropriate. For example, when a predetermined terminal device is not used when a resource is used by the user, the terminal device for using the resource does not have to be included in the system 1. Furthermore, the resource management server 10 and the license management server 20 may be realized by the same device.

The system 1 may manage the resources and licenses for a plurality of tenants. However, in the present embodiment, the description will assume that the resources and licenses are managed for a single tenant.

1.2 Functional Configuration

1.2.1 Resource Management Server

Figure 2:
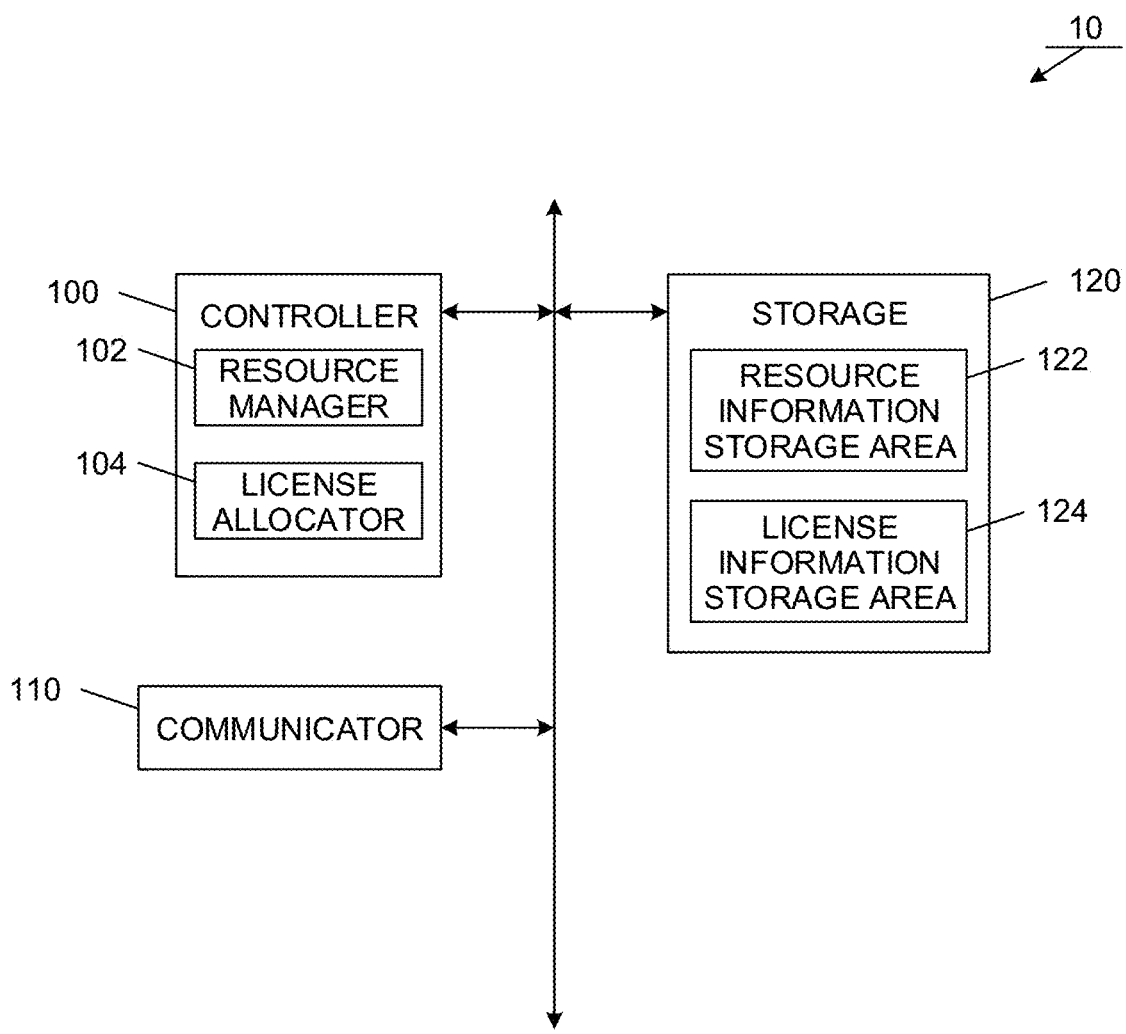
FIG. 2 is a functional block diagram for describing a functional configuration of a resource management server according to the first embodiment.

Next, the configuration of each device included in the system 1 will be described with reference to the drawings. FIG. 2 is a diagram for describing a functional configuration of the resource management server 10. The resource management server 10 includes a controller 100, a communicator 110, and a storage 120.

The controller 100 is a functional unit for controlling the resource management server 10 as a whole. The controller 100 realizes various functions by reading and executing various programs, and is constituted by one or more computation devices (for example, a central processing unit, or CPU).

Furthermore, the controller 100 realizes the functions of a resource manager 102 and a license allocator 104 by reading and executing a program stored in the storage 120.

The resource manager 102 manages resources. That is to say, the resource manager 102 is capable of adding and removing resources to be managed. The resource manager 102 stores information relating to the resources being managed as resource information in a resource information storage area 122.

When a plurality of sets of license information (hereinafter referred to as "license information") is acquired from the license management server 20, the license allocator 104 allocates licenses to the resources managed by the resource management server 10 based on an attribute of the licenses.

When a license becomes allocated to a resource, the resource is activated. When the resource is activated (Active), the user is capable of using the resource. On the other hand, when the resource is not activated (Inactive), the user is unable to use the resource. Note that a resource in an activated state is referred to as an active resource, and a resource in an inactive state is referred to as an inactive resource.

The communicator 110 communicates with other devices such as the license management server 20, and the management terminal device 30 via the network NW. The network NW may be connected by wired connections or wireless connections. For example, the communicator 110 is constituted by a communication module (data transceiver) such as a network interface card (NIC) used by a wired/wireless LAN.

The storage 120 is a functional unit that stores various programs and various data required for operation of the resource management server 10. For example, the storage 120 is constituted by a storage device such as a solid state drive (SSD), which is a semiconductor memory, or a hard disk drive (HDD), which is a magnetic disk.

Furthermore, in the storage 120, a resource information storage area 122 and a license information storage area 124 are provided as storage areas.

The resource information storage area 122 is an area that stores information relating to the resources (resource information). For example, as shown in FIG. 3, the resource information storage area 122 stores as resource information a resource ID (for example, "R1") that identifies a resource, a conference room name (for example, "A-Room") as the name of the conference room, which is an example of a resource, the location of the conference room (for example, "AAA building 12th floor"), the device installed in the conference room (for example, "display device"), and a license ID (for example, "L1") which identifies the license allocated to the resource.

Of the resource information shown in FIG. 3, the conference room name, the location, and the device are attributes of the resource, which is a conference room. Therefore, information other than the information mentioned above (for example, contact information, available times, and detailed device information) may be stored as resource information. If resources other than conference rooms (such as software, devices, or locations) are managed by the resource management server 10, attributes corresponding to the managed resources may be stored as resource information.

When the resource information does not have a stored license ID, the resource does not have an allocated license. For example, in the example of FIG. 3, license ID information is not stored in the resource information having the resource ID "R5". In this case, a license is not allocated to the resource having the resource ID "R5", which indicates that the resource is inactive.

The license information storage area 124 is an area for storing license information. For example, the license allocator 104 acquires the license information from the license management server 20.

For example, as shown in FIG. 4, the license information storage area 124 stores as license information a license ID (for example, "L1") that identifies the license, the number of licenses (for example, "5") which represents the number of resources that the license is capable of activating (the number of licenses that can be allocated to resources), an expiration date (for example, "Jun. 3, 2020"), and a purchase date (for example, "Jun. 3, 2017").

Here, the information such as the number of licenses, the expiration date, and the purchase date are license attributes. The license attributes may include, in addition to the information mentioned above, information about the devices that become available as a result of the license, information relating to fees, and the like.

1.2.2 License Management Server

Figure 5:
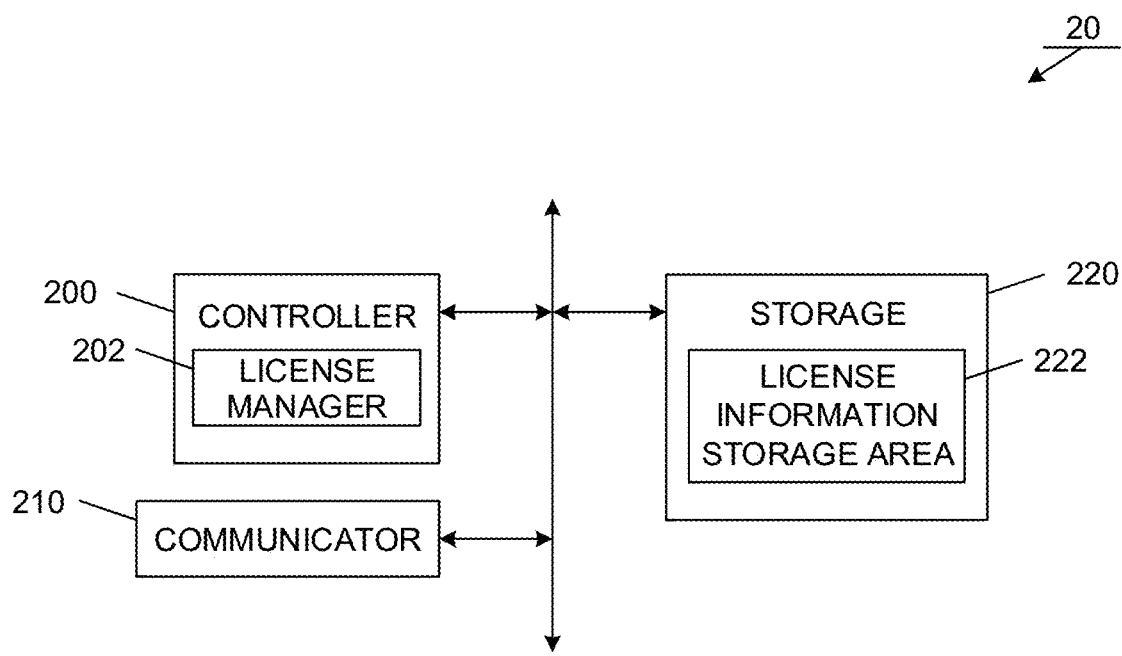
FIG. 5 is a functional block diagram for describing a functional configuration of a license management server according to the first embodiment.

FIG. 5 is a diagram for describing a functional configuration of the license management server 20. The license management server 20 includes a controller 200, a communicator 210, and a storage 220.

The controller 200 is a functional unit for controlling the license management server 20 as a whole. The controller 200 realizes various functions by reading and executing various programs, and is constituted by one or more computation devices (for example, a CPU).

Furthermore, the controller 200 realizes the functions of a license manager 202 by reading and executing a program stored in the storage 220.

The license manager 202 manages the licenses issued to a tenant. For example, when a tenant business operator or administrator enters a new license agreement, the license manager 202 registers new license information. Furthermore, when the expiration date passes, or the agreement is canceled by the tenant business operator or administrator, the license manager 202 removes the license information. Furthermore, when the tenant business operator or administrator enters an agreement to increase in the number of licenses, the license manager 202 may increase the number of licenses of the corresponding license. When the tenant business operator or administrator is issued an extension in the expiration date of a license, the license manager 202 may update the expiration date of the corresponding license.

The communicator 210 is a functional unit for communicating with other devices such as the resource management server 10 via the network NW. The network NW may be connected by wired connections or wireless connections. For example, the communicator 210 is constituted by a communication module (data transceiver) such as an NIC used by a wired/wireless LAN.

The storage 220 is a functional unit that stores various programs and various data required for operation of the license management server 20. For example, the storage 220 is constituted by a storage device such as an SSD, which is a semiconductor memory, or an HDD, which is a magnetic disk.

Furthermore, a license information storage area 222 is provided in the storage 220. The license information storage area 222 stores the license information managed by the license manager 202.

1.2.3 Management Terminal Device

Figure 6:
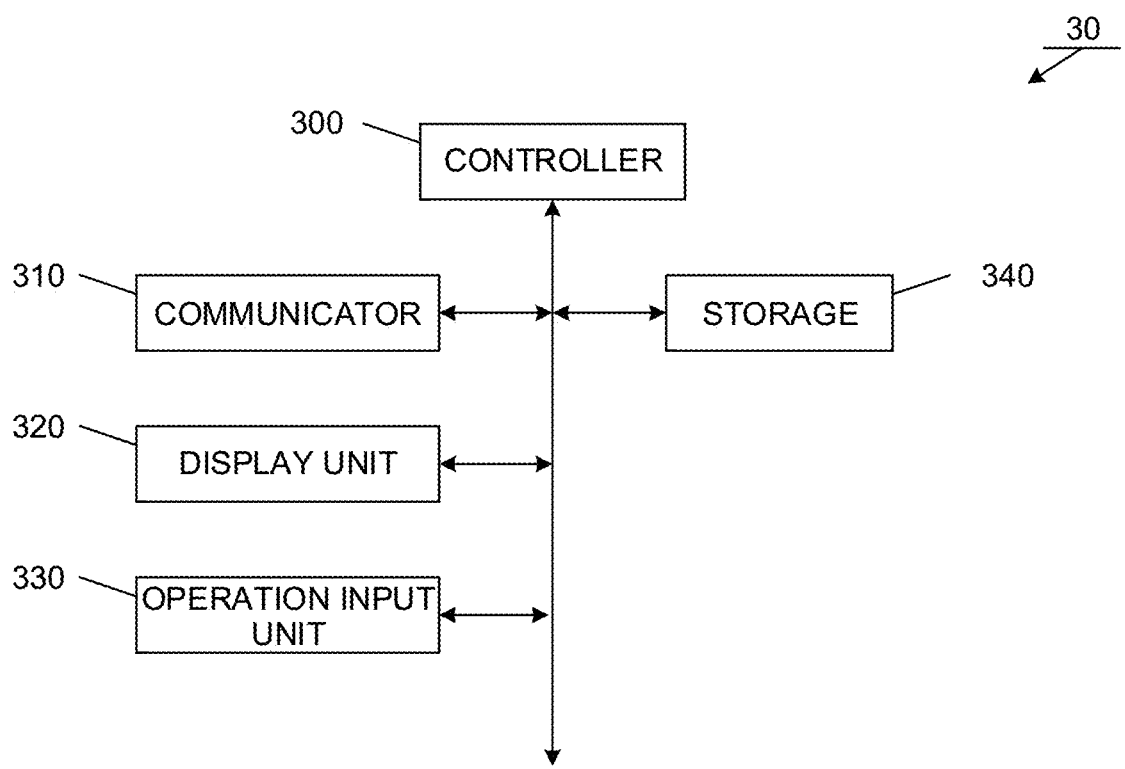
FIG. 6 is a functional block diagram for describing a functional configuration of a management terminal device according to the first embodiment.

FIG. 6 is a diagram for describing a functional configuration of the management terminal device 30. The management terminal device 30 includes a controller 300, a communicator 310, a display unit 320, an operation input unit 330, and a storage 340.

The controller 300 is a functional unit for controlling the management terminal device 30 as a whole. The controller 300 realizes various functions by reading and executing various programs, and is constituted by one or more computation devices (for example, a CPU).

The communicator 310 is a functional unit for communicating with other devices via the network NW. The network NW may be connected by wired connections or wireless connections. For example, the communicator 310 is constituted by a communication module (data transceiver) such as an NIC used by a wired/wireless LAN.

The display unit 320 is a functional unit for displaying various information. For example, the display unit 320 is constituted by a display device such as a liquid crystal display (LED) or an organic light-emitting diode (OLED) display.

The operation input unit 330 is a functional unit that accepts operation inputs from the user. The operation input unit 330 is configured by an external input device such as a keyboard or a mouse.

The storage 340 is a functional unit that stores various programs and various data required for operation of the management terminal device 30. For example, the storage 340 is constituted by a storage device such as an SSD, which is a semiconductor memory, or an HDD, which is a magnetic disk.

1.3 Processing Flow

Figure 7:
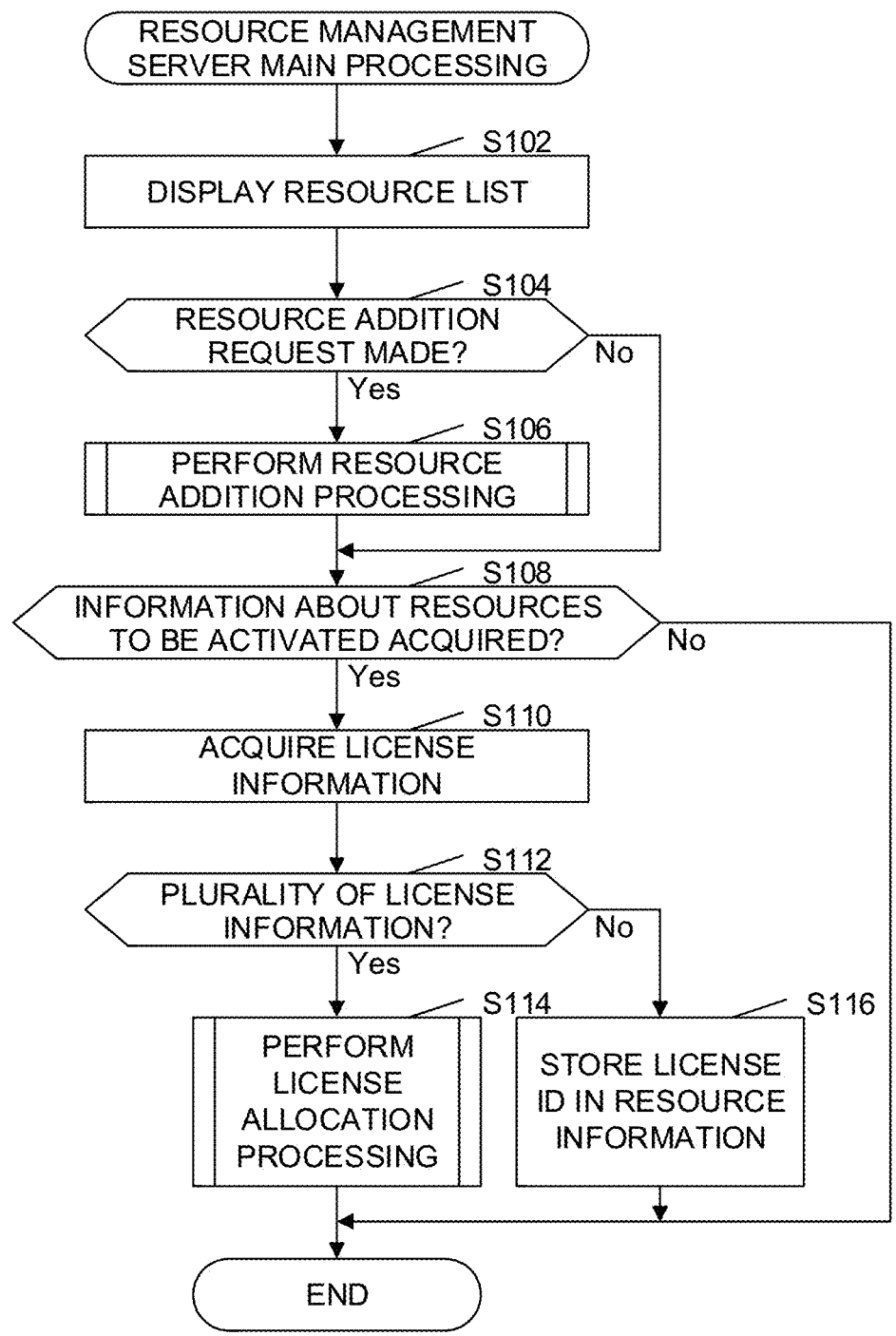
FIG. 7 is a flow diagram for describing the flow of main processing in a resource management server in the first embodiment.

Next, the processing of the resource management server 10 in the present embodiment will be described with reference to FIG. 7. FIG. 7 is a diagram showing the flow of main processing executed as a result of the controller 100 of the resource management server 10 reading a program from the storage 120.

The controller 100 firstly performs control that displays the resources in a list (step S102). For example, the controller 100 reads resource information from the resource information storage area 122, and transmits the read resource information to the management terminal device 30.

The controller 100 may rearrange the resource information read from the resource information storage area 122 before transmitting it to the management terminal device 30. The arrangement order of the resource information may be in order of the resource ID, in order based on a resource attribute (for example, in order based on the names of the resources (the conference room name in the present embodiment) or in order of the number or types of devices), in the order in which the resources were added, or the like. Furthermore, the arrangement order of the resource information may be a grouping according to whether or not a license has been allocated to the resource. The arrangement order of the resource information may be set in advance or specified by the user. The user may also select whether the arrangement order is an ascending order or a descending order.

When the resource information is received, the management terminal device 30 displays resource attributes such as the names of the resources (conference room names in the present embodiment) on the display unit 320. Furthermore, when information is stored in the license ID field of the resource information, the management terminal device 30 may discriminatively display the resource to indicate that it is an active resource. For example, the management terminal device 30 displays the background color of the area in which the attributes of active resources are displayed in a different color to the background color of the area in which the attributes of inactive resources are displayed. The management terminal device 30 may indicate whether or not a resource is an active resource by displaying an icon or text. It may also display the area in which the attributes of inactive resources are displayed grayed out so as to make the active resources stand out.

Figure 8:
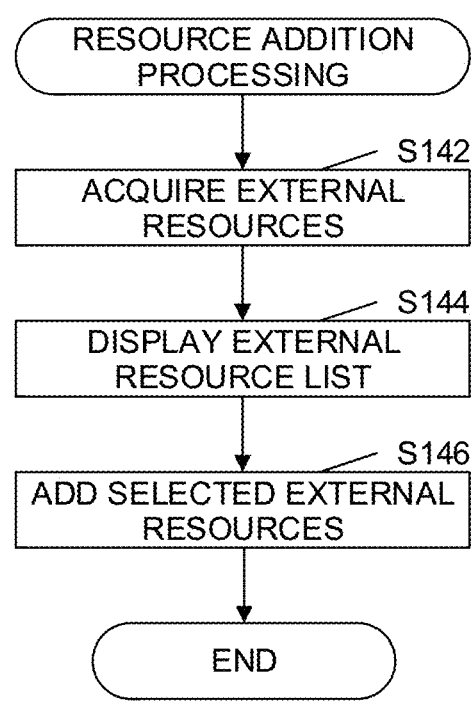
FIG. 8 is a flow diagram for describing the flow of resource addition processing in the first embodiment.

Next, the controller 100 determines whether or not a request to add a resource has been made (step S104). The request to add a resource is transmitted, for example, from the management terminal device 30 based on a user operation. If a request to add a resource has been made, the resource manager 102 executes resource addition processing (step S104; YES→step S106). The resource addition processing will be described with reference to FIG. 8.

The resource manager 102 firstly acquires information relating to addable resources (step S142), and generates a list display of the acquired addable resources (step S144). Then, the resource manager 102 stores the resource that has been selected from among the resources in the list displayed in the resource information storage area 122 (step S146).

Here, the addable resources may be applied by an external service or may be input by the user.

Returning to FIG. 7, the controller 100 determines whether or not information about a resource to be activated has been acquired (step S108). The information about the resource to be activated is information that enables the resource to be activated to be specified. For example, it is the resource IDs of one or more resources selected by the user to be activated. In this case, the controller 300 of the management terminal device 30 transmits the information about the resource to be activated to the resource management server 10 when the user selects the resource to be activated. Furthermore, the controller 100 of the resource management server 10 determines that the information about the resource to be activated has been acquired when the information about the resource to be activated is received from the management terminal device 30. Note that the controller 100 may acquire the information about the resource to be activated from a device connected to the network NW, or acquire the information based on a user operation performed with respect to the resource management server 10.

When the information about the resource to be activated is acquired, the controller 100 acquires license information from the license management server 20 via the communicator 110 (step S108; Yes→step S110). The controller 100 stores the acquired license information in the license information storage area 124.

Then, the controller 100 determines whether or not a plurality of sets of license information was acquired in step S110 (step S112). If a plurality of sets of license information was acquired, the license allocator 104 performs license allocation processing (step S112; Yes→step S114).

In the present embodiment, the license allocator 104 allocates a license to the resource to be activated based on a date attribute. As the method of allocating a license based on a date attribute, for example, methods that allocate a license in the following order can be considered.

Figure 9:
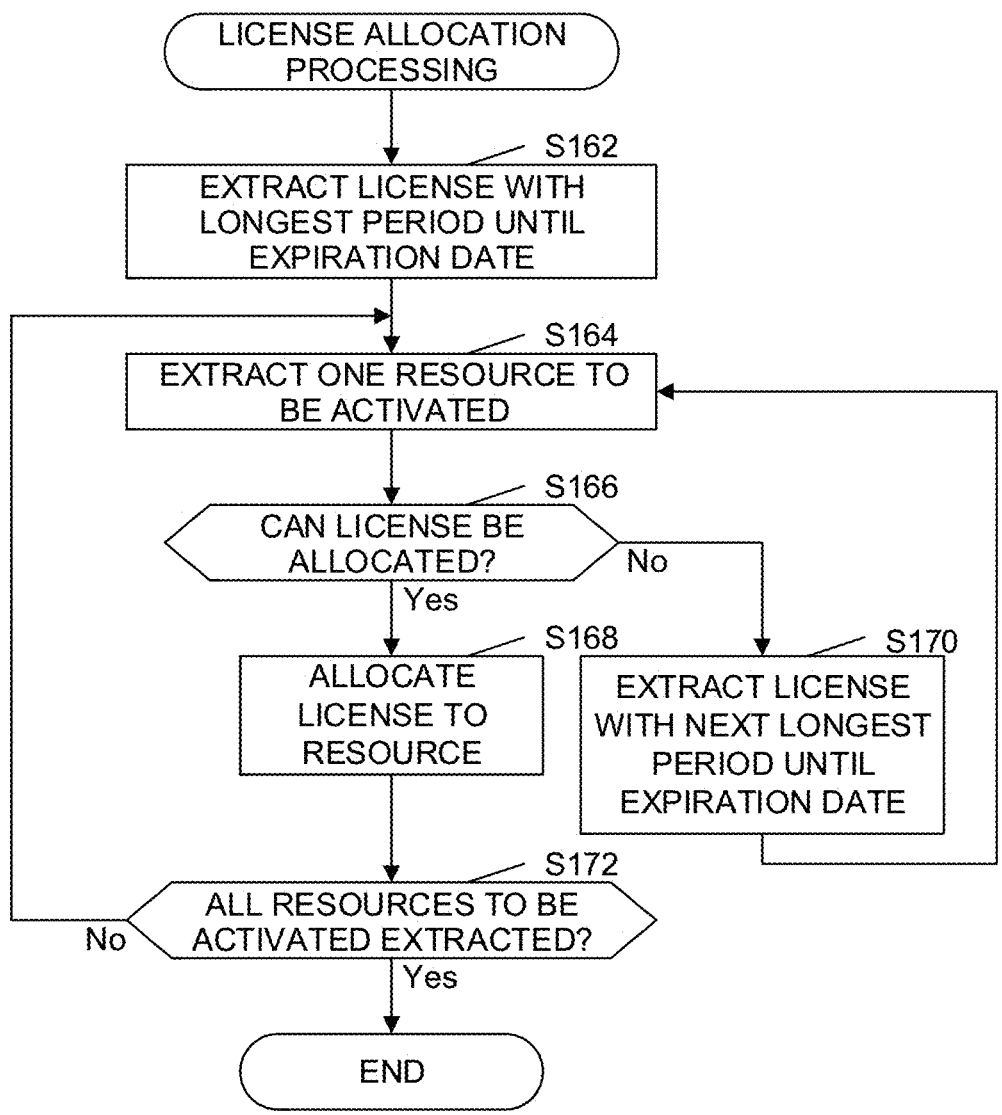
FIG. 9 is a flow diagram for describing the flow of license allocation processing in the first embodiment.

(1) In order from the longest period until the expiration date (2) In order from the shortest period until the expiration date (3) In order from the earliest license purchase date Here, an example of the license allocation processing will be described with reference to FIG. 9. Note that FIG. 9 is a diagram showing the processing flow for allocating a license to a resource in order from the longest period until the expiration date.

First, the license allocator 104 extracts the license information having the longest period until the expiration date (step S162). For example, the license allocator 104 reads the license information stored in the license information storage area 124, and extracts the license information storing the latest date as the expiration date.

Then, the license allocator 104 selects one resource from the resources to be activated (step S164). For example, the license allocator 104 extracts one piece of resource information from the information about the resources to be activated acquired in step S110. If there is a plurality of resources to be activated, the license allocator 104 may, for example, extract the resource information in order of the resource IDs or in the order in which the resources were added.

Next, the license allocator 104 determines whether or not the currently extracted license can be allocated (step S166). A license can be allocated when the following conditions are satisfied.

(1) The license is not in the number of licenses allocated to the displayed number of resources (2) The expiration date of the license has not passed For example, (1) is determined as a result of the license allocator 104 calculating a value obtained by subtracting the number of resources storing the license ID of the currently extracted license from the number of licenses associated with the currently extracted license. If the calculated value is positive, the license allocator 104 determines that the license is not in the number of licenses allocated to the displayed number of resources.

If the license can be allocated, the license allocator 104 allocates the license to the resource selected in step S164 (step S166; Yes→step S168). For example, the license allocator 104 reads from the resource information storage area 162 the resource information corresponding to the information about the resource extracted in step S164, and stores the license ID of the license information extracted in step S162.

On the other hand, if the license cannot be allocated, the license allocator 104 extracts the license having the next longest period until the expiration date (step S166; No→step S170). Then, the license allocator 104 returns to step S166.

Then, the license allocator 104 determines whether or not all of the resources corresponding to the information about the resources to be activated acquired in step S110 have been extracted (step S172). If all of the resources have been extracted, the license allocator 104 ends the license allocation processing (step S172; Yes). On the other hand, if all of the resources have not been extracted, the flow returns to step S164 (step S172; No→step S164).

The license allocator 104 may end the license allocation processing before all of the resources to be activated have been extracted if there are no licenses that can be allocated.

In step S112 of FIG. 7, if one set of license information is acquired in step S110, the controller 100 stores the license ID of the license information acquired in step S112 in the license ID field of the resource information of the resource to be activated (step S116). That is to say, when one set of license information is acquired, the controller 100 allocates the one acquired license to the resource to be activated.

As a result of the above processing, licenses can be allocated to the resources to be activated in order from the resource having the longest period until the expiration date. If the licenses are allocated in order from the shortest period until the expiration date, the license allocator 104 extracts the license having the shortest period until the expiration date in step S164, and extracts the license having the next shortest period until the expiration date in step S170. If the licenses are allocated in order from the earliest purchase date, the license allocator 104 extracts the license having the earliest purchase date in step S164, and extracts the license having the next earliest purchase date in step S170.

1.4 Operation Example

An operation example of the present embodiment will be described. Note that it is assumed that the licenses shown in FIG. 4 are being managed in advance in the license management server 20 by the tenant business operator or administrator. Specifically, it is assumed that a license (license ID "L1") whose number of licenses is "3" and having an expiration date of "Jun. 3, 2020", a license (license ID "L2") whose number of licenses is "2" and having an expiration date of "Mar. 31, 2020", and a license (license ID "L3") whose number of licenses is "5" and having an expiration date of "Dec. 31, 2019" have been issued. Furthermore, it is assumed that the license allocator 104 rearranges the license information in order from the expiration date which is farthest from the current date.

Figure 10:
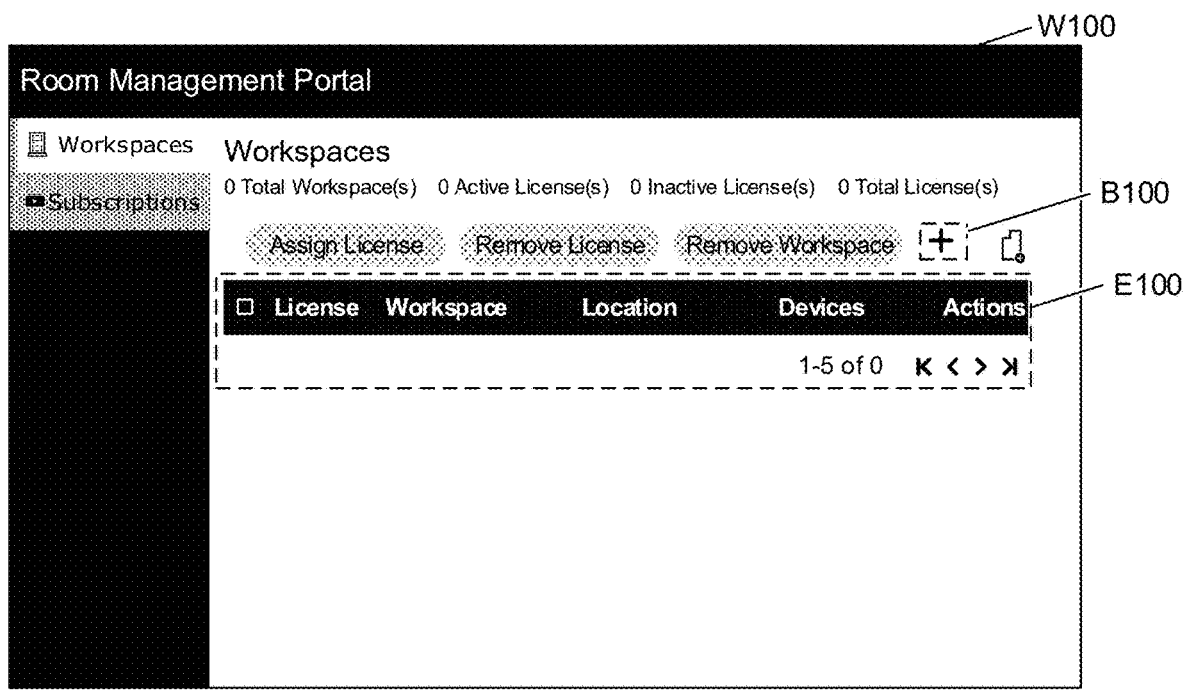
FIG. 10 is a diagram showing an operation example in the first embodiment.

FIG. 10 is an example of a display screen W100 displayed on the display unit 320 when the user uses the management terminal device 30 to connect to the resource management server 10. The display screen W100 includes an area E100 that displays a resource list, and a button B100 to add a resource. Here, the management terminal device 30 receives the resource information from the resource management server 10, and reads the resource attributes to be displayed in the area E100 from the received resource information. FIG. 10 is an example of the display screen W100 in a case where there are no resources managed by the resource management server 10. Therefore, information such as resource attributes are not displayed in the area E100.

Figure 11:
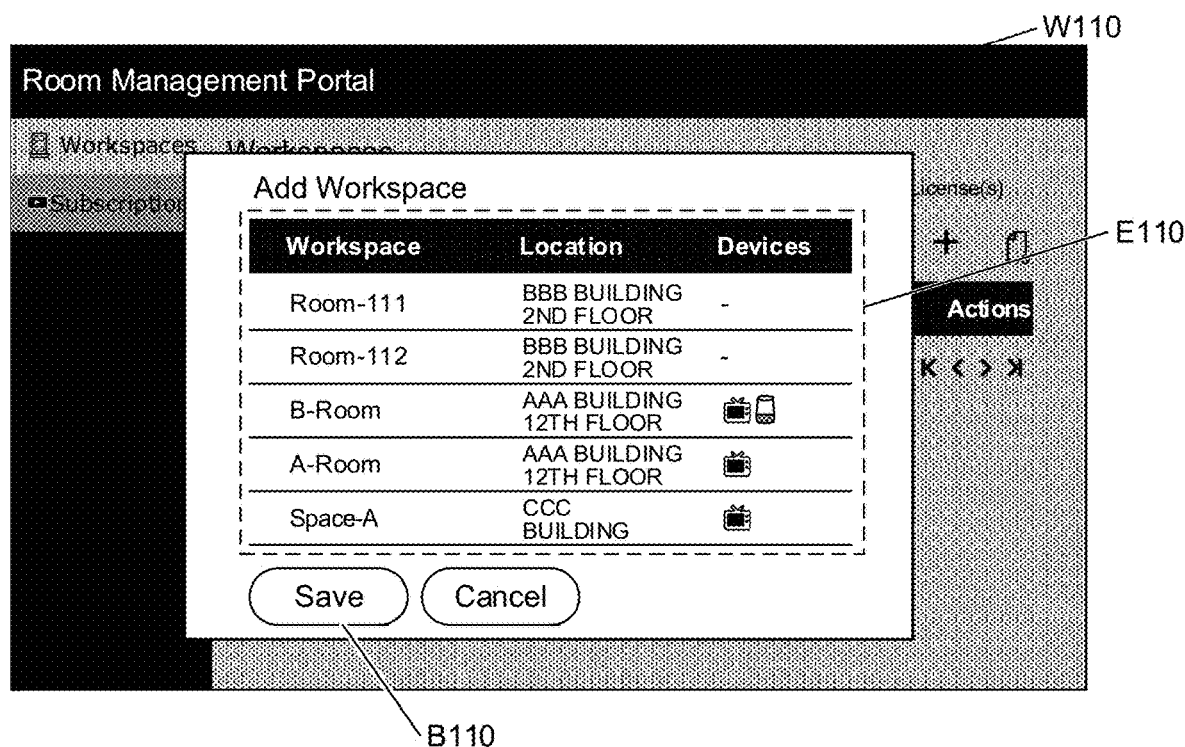
FIG. 11 is a diagram showing an operation example according to the first embodiment.

FIG. 11 is an example of a display screen W110 displayed on the display unit 320 when the user selects the button B100 on the display screen W100. The display screen W110 includes an area E110 that displays a list of information relating to addable resources (external resources) acquired from an external service. As shown in FIG. 11, for example, the area E110 may be included inside a popup window. The user selects the desired external resources to be added from the area E110, and selects a button B110 for adding the selected external resources. As a result, the user is capable of adding the selected external resources as resources to be managed.

Figure 12:
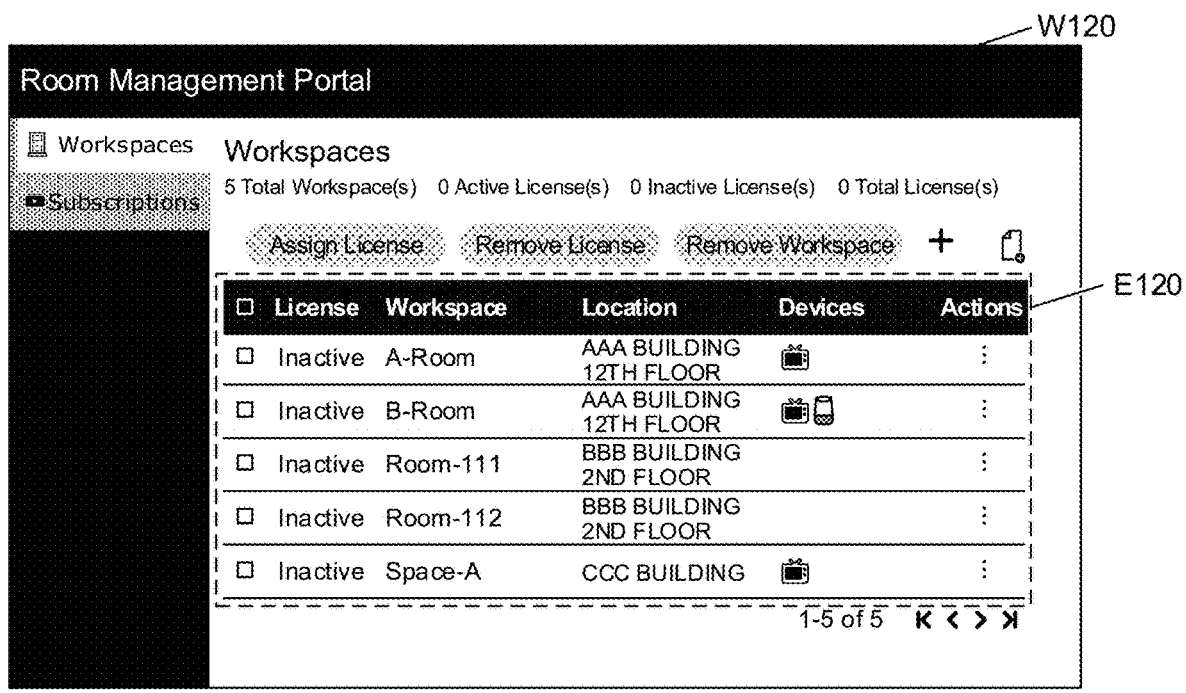
FIG. 12 is a diagram showing an operation example according to the first embodiment.

FIG. 12 is an example of a display screen W120 displayed on the display unit 320 when a total of five external resources are added by the user as resources to be managed. In this case, the system 1 indicates that a certain tenant has five conference rooms. The display screen W120 includes an area E120 that displays resources in a list. The area E120 displays, for the resources added by the user, information such as the conference room name, the location, and devices, which are resource attributes. Note that, as shown in the example of FIG. 12, the device information may be represented by an icon that indicates the device type.

The resource is inactive at the stage the resource is added. In the example of FIG. 12, the text "Inactive", which indicates that the resource is inactive, is displayed to the left of the conference room name, which is a resource attribute.

Figure 13:
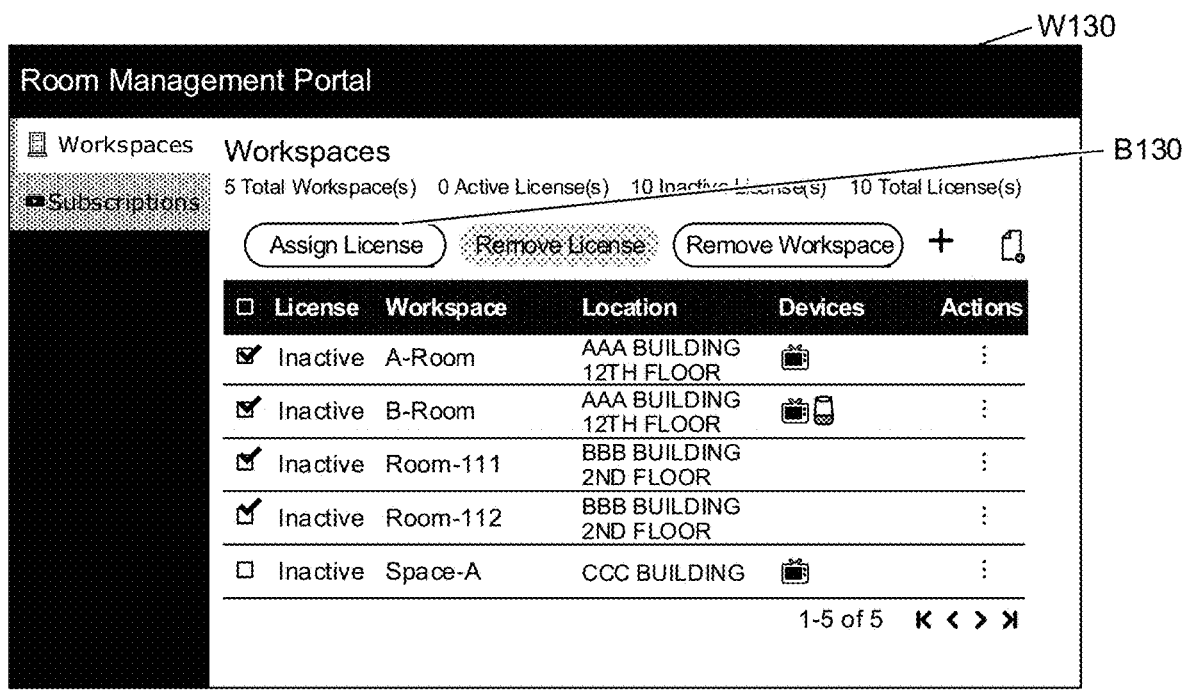
FIG. 13 is a diagram showing an operation example according to the first embodiment.

FIG. 13 is an example of a display screen W130 displayed on the display unit 320 when four resources are selected. In the display screen W130, a check mark is displayed in a check box to indicate that the resource is selected. The user is able to switch between displaying/not displaying the check mark by selecting the check box with a mouse or the like.

If a button B130 for allocating licenses is selected when one or more resources are selected, the management terminal device 30 transmits the resource IDs of the selected resources to the resource management server 10. In the example of FIG. 13, four resources are selected. Therefore, four resource IDs are transmitted from the management terminal device 30 to the resource management server 10.

The resource management server 10 receives four resource IDs from the management terminal device 30 as information about the resources to be activated. The resource management server 10 stores, for each resource ID, a license ID in the resource information storing the resource ID. The resource management server 10 acquires license information from the license management server 20, and stores, in the resource information, the order of the license IDs after arranging the licenses in order from the license expiration date which is farthest from the current date.

Here, the license having the expiration date which is farthest from the current date is the license having the license ID "L1". Therefore, the resource management server 10 allocates the license to three of the four resources to be activated. Furthermore, the license having the expiration date which is next farthest from the current date is the license having the license ID "L2". Therefore, the resource management server 10 allocates the license with respect to one of the four resources to be activated. Then, the resource management server 10 transmits resource information to the management terminal device 30 again.

Figure 14:
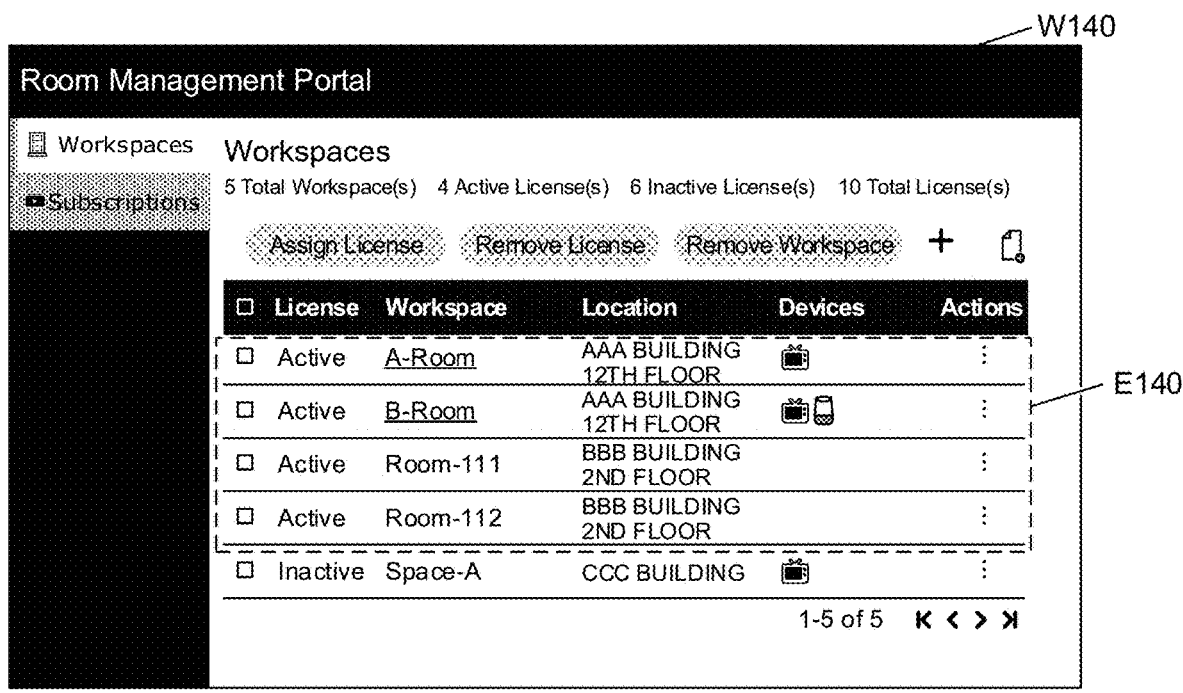
FIG. 14 is a diagram showing an operation example according to the first embodiment.

FIG. 14 is an example of a display screen W140 displayed on the display unit 320 after the licenses have been allocated. The display screen W140 includes an area E140 that displays the resources in a list. The area E140 displays the attributes of the four resources selected on the display screen W130 of FIG. 13. Furthermore, the text "Active", which indicates that the resource is active, is displayed to the left of the conference room name, which is a resource attribute. The user is capable of recognizing the active resources by viewing the resource information displayed with the text "Active".

Note that, in the screens shown in FIG. 10 to FIG. 14, which include an area which displays the resources in a list, a button or the like may be displayed which enables an operation such as removing an allocated license from a resource, or removing a resource.

For example, when an active resource is selected, a button that removes the allocated license from the selected resource may be selectable. If the button that removes the allocated license is selected by the user, the controller 100 of the resource management server 10 stores the resource information after removing the license ID from the resource information of the selected resource. As a result, the resource becomes inactive.

Furthermore, when an inactive resource is selected, in addition to a button that allocates a license, a button that removes the selected resource may be selectable. If the button that removes the resource is selected by the user, the resource manager 102 of the resource management server 10 removes the resource information of the selected resource from the resource information storage area 122. As a result, the resource selected by the user is excluded from the resources managed by the resource management server 10.

If an active resource and an inactive resource are selected, a button that removes the allocation may be selectable, and the allocation may be removed from the active resource among the selected resources.

Furthermore, if the button that allocates a license is selected, the resource management server 10 or the management terminal device 30 may compare the number of licenses that can be allocated to resources with the number of resources to be activated, and determine whether or not the licenses can be allocated. If the number of resources to be activated exceeds the number of licenses that can be allocated to resources, for example, the resource management server 10 notifies the management terminal device 30 that there are not enough licenses. Instead of transmitting the resource IDs of the selected resources, the management terminal device 30 may display on the display unit 320 a display indicating that there are not enough licenses. Furthermore, if the number of resources to be activated exceeds the number of licenses that can be allocated to resources, the management terminal device 30 may cancel the selected state of the resources and prompt the user to select the resources again.

Figure 15:
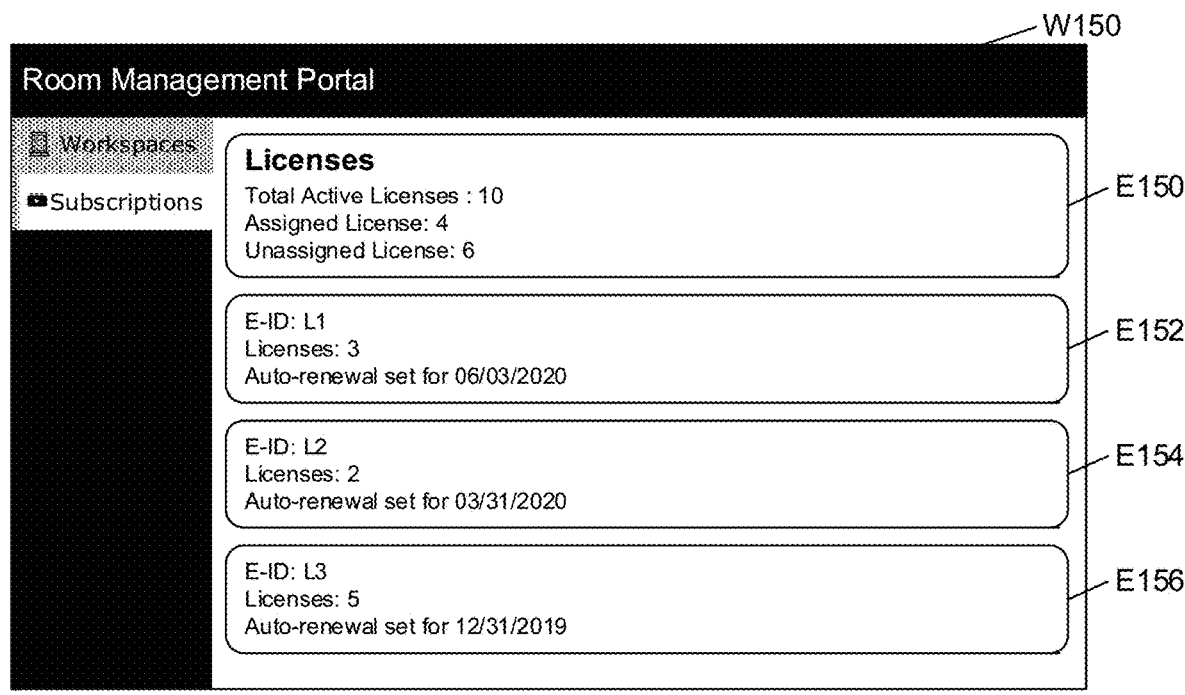
FIG. 15 is a diagram showing an operation example according to the first embodiment.

Moreover, the management terminal device 30 may display a screen that displays license information. For example, FIG. 15 is an example of a display screen W150 which displays license information in a list. The display screen W150 includes an area E150 displaying a summary of the licenses issued to the tenant business operator or administrator. The area E152, area E154, and area E156 display information about each of the licenses. The license summary and information about each of the licenses are displayed as a result of the management terminal device 30 receiving the license information stored in the license information storage area 124 from the resource management server 10.

The area E150 stores information such as the total number of issued licenses, the number of licenses that have been allocated to resources, and the number of licenses that have not been allocated to resources. Furthermore, the area E152, the area E154, and the area E156 each display the number of licenses and the expiration date. The number of areas provided displaying information about each of the licenses is equivalent to the number of pieces of license information received from the resource management server 10. The user is capable of recognizing the license information by viewing the display screen W150.

The controller 100 may determine, at a predetermined timing, whether or not the license allocated to a resource is active. When a license is active, the license is managed by the license management server 20, and is within the expiration date. For example, the controller 100 transmits the license ID to the license management server 20 periodically, or before performing a control that displays the resources in a list, and receives the result of whether or not the license is active from the license management server 20. If the license is not active, the controller 100 removes the license ID information from the resource information and stores the resource information again. As a result, the controller 100 is capable of performing a control that displays the resources in a list after resolving the situation where an inactive license is allocated to a resource. The license management server 20 may transmit a notification to the resource management server 10 when a license expires. In this case, the resource management server 10 may remove, based on the received notification, the license ID information from the resource information of the resource to which the expired license was allocated, and store the resource information again.

According to the present embodiment, it is possible to allocate a license to a resource based on, among the license attributes, date-related information. For example, by allocating licenses to the resources in order from the expiration date which is farthest from the current date, the user is capable of reducing the trouble of allocating licenses as much as possible. Furthermore, by allocating licenses to the resources in order from the expiration date which is nearest from the current date, the user is able to prevent licenses with a near expiration date from being left unallocated, or prevent licenses from expiring and being wasted. In addition, when the expiration date of the license takes the form of a fixed period (for example, one year) from the start of use of the license, by allocating the licenses to the resources in order from the earliest license purchase date, the licenses expire in order from those allocated earliest to a resource. As a result, the tenant business owner or administrator is capable of reducing the complexity of license management without worrying about which licenses are allocated to the resources.

2. Second Embodiment

Next, a second embodiment will be described. Unlike the first embodiment, the second embodiment is an embodiment in which the resource information and the license information store function and device information, and licenses are allocated to the resources based on the function information. The description of the second embodiment will mainly describe the aspects that are different from the first embodiment.

A function in the present embodiment refers to a function which can be executed or used with a resource when the user uses the resource. Because the resource is a conference room in the present embodiment, the resource information stores information about functions that can be executed or used when the user uses the conference room.

In the present embodiment, the functions that can be executed or used when the user uses the conference room are referred to as conference functions. Furthermore, a device may be provided which is used when the user uses a conference function. In addition, the device may be capable of using a function that supports the use of the conference function.

For example, the conference functions include the following functions.

(1) Voice Operation Function

This is a function that enables voice operations using a smart speaker. A voice operation refers to, for example, an operation that starts or ends a conference, specifies and displays materials, or turns the pages of the materials by voice. In order to realize the voice operation function, the conference room may be provided with devices including a display device such as an interactive white board (IWB), a voice input device such as a smart speaker, and a built-in PC to which the display device and the voice input device are connected. Furthermore, the built-in PC may be capable of using a function that supports the correspondence between the display device and the voice input device.

(2) Video Conferencing Function

This is a function that enables online conferencing using images and voice between one or more remote locations. In order to realize the video conferencing function, the conference room may be provided with a capture device such as a camera, a voice input device such as a microphone, a display device such as an IWB, and a built-in PC. Furthermore, the built-in PC may be capable of using a function that supports the connections to the remote locations, and a function that realizes a screen sharing function.

(3) Voice Conferencing Function

This is a function that enables online conferencing using voice between one or more remote locations. In order to realize the voice conferencing function, the conference room may be provided with a voice input device such as a microphone, and a built-in PC. Furthermore, the built-in PC may be capable of using a function that supports the connections to the remote locations.

(4) Device Casting Function

This is a function that enables the video of a portable terminal device (such as a notebook computer or a tablet) brought in by the user to be displayed on a display device provided in the conference room. In order to realize the device casting function, the conference room is provided with a display device such as an IWB, a casting device for displaying the screen displayed on the portable terminal device brought in by the user on the display device, and the like.

2.1 Resource Information

The resource information of the present embodiment will be described with reference to FIG. 16. In the present embodiment, the conference room name, the location, and the conference functions that can be executed or used by the user when the resource is used (for example, "video conferencing function, voice conferencing function") are stored in the resource information as attributes.

In the example of FIG. 16, the conference room having the resource ID "R1" is a conference room in which the video conferencing function and the voice conferencing function can be used. On the other hand, the conference room having the resource ID "R3" is a conference room in which neither of the conference functions can be used.

2.2 License Allocation Processing

Next, the license allocation processing executed by the license allocator 104 will be described. The license allocator 104 executes license allocation processing according to one of two methods based on the attributes stored in the license information.

2.2.1 Method Based on Number of Available Conference Functions

This is a method executed by the license allocator 104 when the number of available conference functions is stored as an attribute in the license information. The number of available conference functions refers to the number of conference functions that can be used by the user if that license is allocated.

FIG. 17 shows the license information when this method is executed by the license allocator 104. As shown in FIG. 17, the license information stores the number of available conference functions as a license attribute. The number of available conference functions stores an integer of 0 or more, or "unlimited" when the number of available conference functions is not limited.

The license allocation processing of the present embodiment will be described with reference to FIG. 18. In the license allocation processing of the present embodiment, the license allocator 104 extracts, among the license information stored in the license information storage area 124, the license having the largest number of available conference functions (step S202). Note that the license allocator 104 treats the license information having an "unlimited" number of available conference functions as the license information having the largest number of available conference functions.

Furthermore, the license allocator 104 extracts the resource having the largest number of conference functions from the resources to be activated (step S204).

Then, if the currently extracted license can be allocated, the license allocator 104 allocates the currently extracted license to the currently extracted resource (step S166; Yes→step S168). On the other hand, if the currently extracted license cannot be allocated, the license allocator 104 extracts the license having the next largest number of available conference functions (step S166; No→step S206).

Then, the license allocator 104 determines whether or not all of the resource information corresponding to the information about the resources to be activated has been extracted (step S172). If all of the resources to be activated have been extracted, the license allocator 104 ends the license allocation processing (step S172; Yes). On the other hand, if all of the resources to be activated have not been extracted, the resource having the next largest number of conference functions is extracted from the resources to be activated, and the flow returns to step S166 (step S172; No→step S208→step S166).

In addition to the information about the number of available conference functions, the license information may store information about unavailable conference functions. For example, information indicating that the number of available conference functions is "1", and information indicating that the "video conferencing function" is an unavailable conference function may be stored. If such a license is allocated to a conference room in which the video conferencing function and the voice conferencing function are available, the user is unable to use the video conferencing function. In this case, the user is unable to use devices such as a camera for video conferencing, and is unable to use the screen sharing function using a PC which is built into the conference room. Therefore, only the voice conferencing function is available. Note that, even in this case, devices such as the camera may be made available for functions and uses (for example, capturing materials) other than the unavailable conference function (for example the video conferencing function).

As a result of the license allocator 104 executing the license allocation processing described above, licenses having the largest number of available conference functions can be allocated in order from the resource having the largest number of conference functions. Consequently, the resource management server 10 is capable of making many functions available to the user. Furthermore, although licenses having a larger number of available conference functions generally have a higher cost, the resource management server 10 is able to prevent licenses having a high cost from being left unallocated to the user.

2.2.2 Method Based on Type of Available Conference Functions

This is a method executed by the license allocator 104 when the type of available conference functions is stored as an attribute in the license information.

FIG. 19 shows the license information when this method is executed by the license allocator 104. As shown in FIG. 19, the license information stores, for each available conference function, information indicating whether or not the available conference function is available as an attribute. For example, the resources having the voice operation function available to the user store "available" as the voice operation function attribute. On the other hand, the resources which do not have the voice operation function available to the user store "unavailable" as the voice operation function attribute.

The license allocation processing of the present embodiment will be described with reference to FIG. 20. In the license allocation processing of the present embodiment, the license allocator 104 firstly extracts one resource from the resources to be activated (step S164).

Then, the license allocator 104 extracts a license which can be allocated to the resource from the license information storage area 124 (step S222). For example, the license allocator 104 reads the license information stored in the license information storage area 124, and determines for each set of license information whether or not the license can be allocated in the same manner as step S166 of the first embodiment. Then, the license allocator 104 extracts the license information of the licenses for which it has determined that the license can be allocated.

Next, the license allocator 104 calculates, for each license extracted in step S222, the number of conference functions that would become available when the license is allocated to the resource extracted in step S162 (step S224). For example, the license allocator 104 calculates, for each set of license information extracted in step S222, the number of matches between the conference functions stored as being "available" in the license information and the conference functions stored in the resource information corresponding to the resource extracted in step S162.

Then, the license allocator 104 determines the license having the largest number calculated in step S224, that is to say, the license that provides the best match with the conference functions relating to the resource (step S226). Then, the license allocator 104 allocates the license determined in step S226 to the resource extracted in step S162 (step S168).

Generally, a license having a larger number of available conference functions has a higher cost. Therefore, a license having a smaller number of available conference functions may be issued. Even in such a case, the license allocator 104 is capable of allocating a license that matches a large number of conference functions serving as resource attributes by executing the license allocation processing described above. Therefore, the resource management server 10 is capable of allocating a license matching the resource by allocating a license that provides matches with respect to a large number of conference functions. Further, if the licenses are allocated all at once, it is possible for the user to avoid incurring excessive costs.

Note that, the description above assumes that the resource information and the license information store information relating to the conference functions. However, device information may be stored instead of the information relating to the conference functions. In this case, the license information stores the number of available devices and information about the available devices as attributes.

If the license information stores the number of available devices, the license allocator 104 allocates licenses having a large number of available devices in order from the resources having the largest number of devices. As a result, the license allocator 104 is capable of making many devices available to the user.

If a license which has an unlimited number of available devices is allocated to a conference room, the user is capable of using the devices provided in the conference room without restriction. On the other hand, if a license which does not have an unlimited number of available devices is allocated to a conference room, the user is capable of using, among the devices provided in the conference room, the number of devices defined in the license. The license information may store information about unavailable conference devices (for example, the smart speaker or the IWB).

Furthermore, if device information is stored in the license information, the license allocator 104 allocates a license after determining the license information of the license that provides the best match with the devices related to the resource.

According to the present embodiment, the resource management server is capable of allocating an appropriate license to a resource based on function and device information.

3. Third Embodiment

Next, a third embodiment will be described. Unlike the first embodiment, the third embodiment is an embodiment in which the resource management server allocates licenses to resources based on information about the number of people. The description of the third embodiment will mainly describe the aspects that are different from the first embodiment.

3.1 Resource Information and License Information

The resource information of the present embodiment will be described with reference to FIG. 21. In the present embodiment, the attributes stored in the resource information are the conference room name, the location, and the maximum capacity. The maximum capacity is the number of users that can be accommodated in the conference room serving as the resource.

The license information of the present embodiment will be described with reference to FIG. 22. In the present embodiment, the attributes stored in the license information are the number of licenses, the maximum number of participants, and the expiration date. The maximum number of participants indicates the upper limit in the number of people that can participate in a conference. Furthermore, it also indicates that the license can be allocated to a resource when the maximum number of participants is less than or equal to the maximum capacity. For example, it indicates that a license having a maximum number of participants of 50 people can be allocated to a resource having a maximum capacity of 50 or more people.

3.2 License Allocation Processing

Next, the license allocation processing executed by the license allocator 104 will be described. The license allocator 104 executes license allocation processing according to one of the two following methods.

Figure 18:
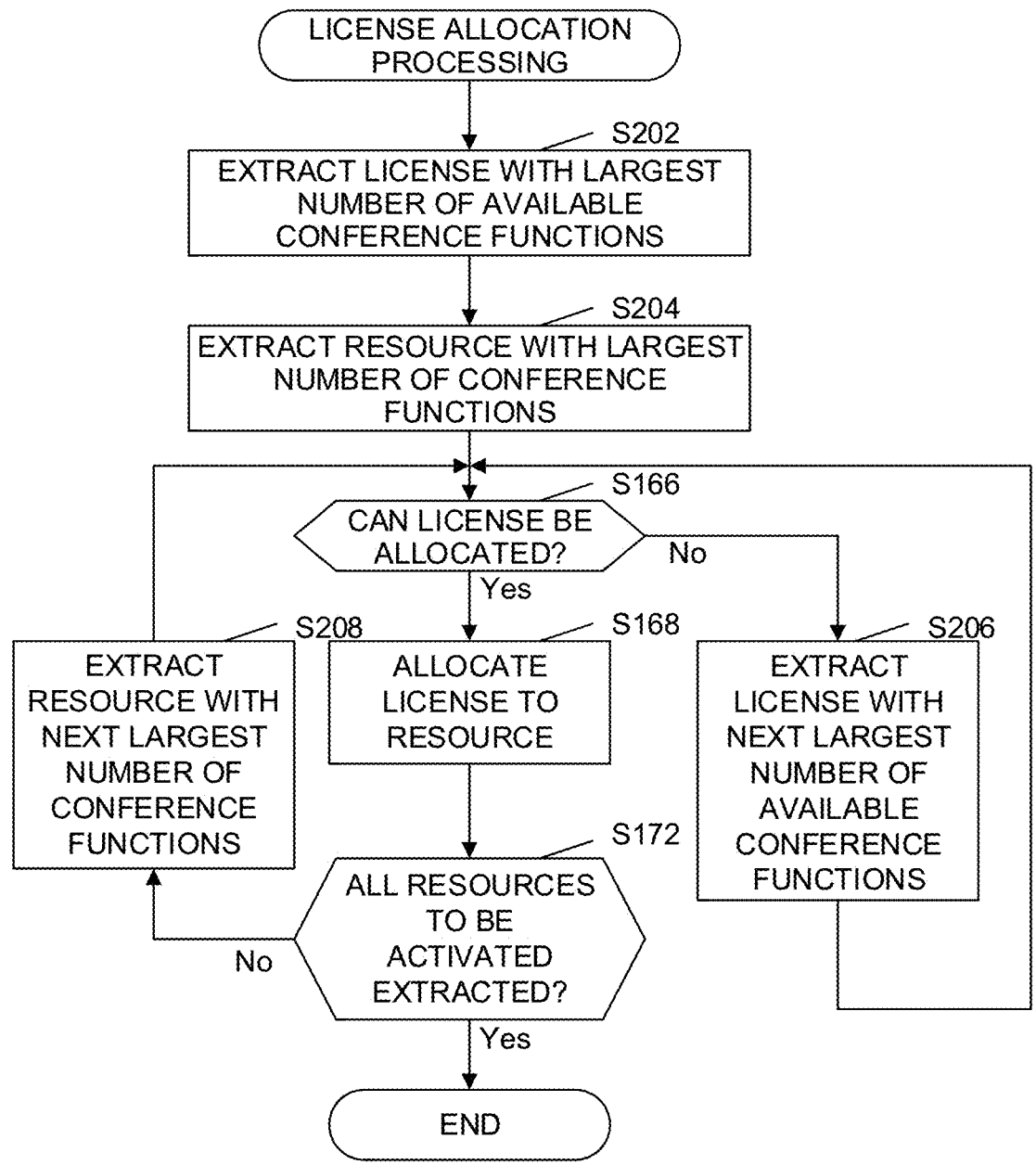
FIG. 18 is a flow diagram for describing the flow of license allocation processing in the second embodiment.

3.2.1 Method of Allocating Licenses in Order from Largest Maximum Number of Participants The license allocator 104 executes processing having a modification to part of the license allocation processing shown in FIG. 18.

Specifically, in step S202, the license allocator 104 extracts the license having the largest maximum number of participants.

In step S204, the license allocator 104 extracts the resource having the largest maximum capacity among the resources to be activated.

In step S166, the license allocator 104 further determines whether or not the following condition is met as a condition that the license can be allocated.

(3) The Maximum Capacity of the Resource is Greater than or Equal to the Maximum Number of Participants of the License As a result of adding this determination, it is possible to limit the number of users to the maximum capacity even when the number of users indicated by the maximum number of participants use the resource. Specifically, if there is a license with 40 people and a license with 60 people as the maximum number of participants, the license allocator 104 determines that the license with a maximum number of participants of 60 people cannot be allocated to a resource with a maximum capacity of 50 people. As a result of this determination, it is possible to avoid, for example, a situation where a resource having a maximum capacity of 50 people is used by 60 users.

In step S206, the license allocator 104 extracts the license having the next largest number of available conference functions.

In step S208, the license allocator 104 extracts the resource having the next largest number of conference functions from the resources to be activated.

As a result of the processing described above, the license allocator 104 is capable of allocating licenses to the resources having the largest maximum capacity among the resources to be activated in order from the license having the largest maximum number of conference participants. Furthermore, although licenses having a larger maximum number of participants generally have a higher cost, the resource management server 10 is able to prevent licenses having a high cost from being left unallocated to the user.

Figure 20:
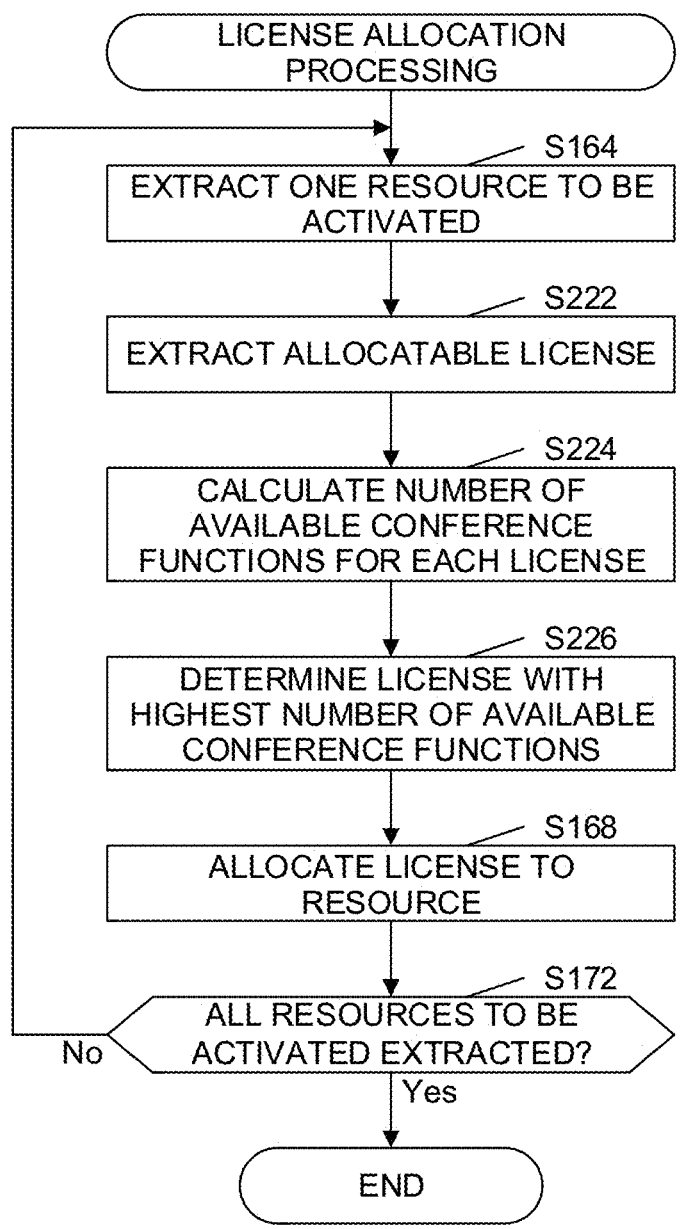
FIG. 20 is a flow diagram for describing another example of the flow of license allocation processing in the second embodiment.
Figure 23:
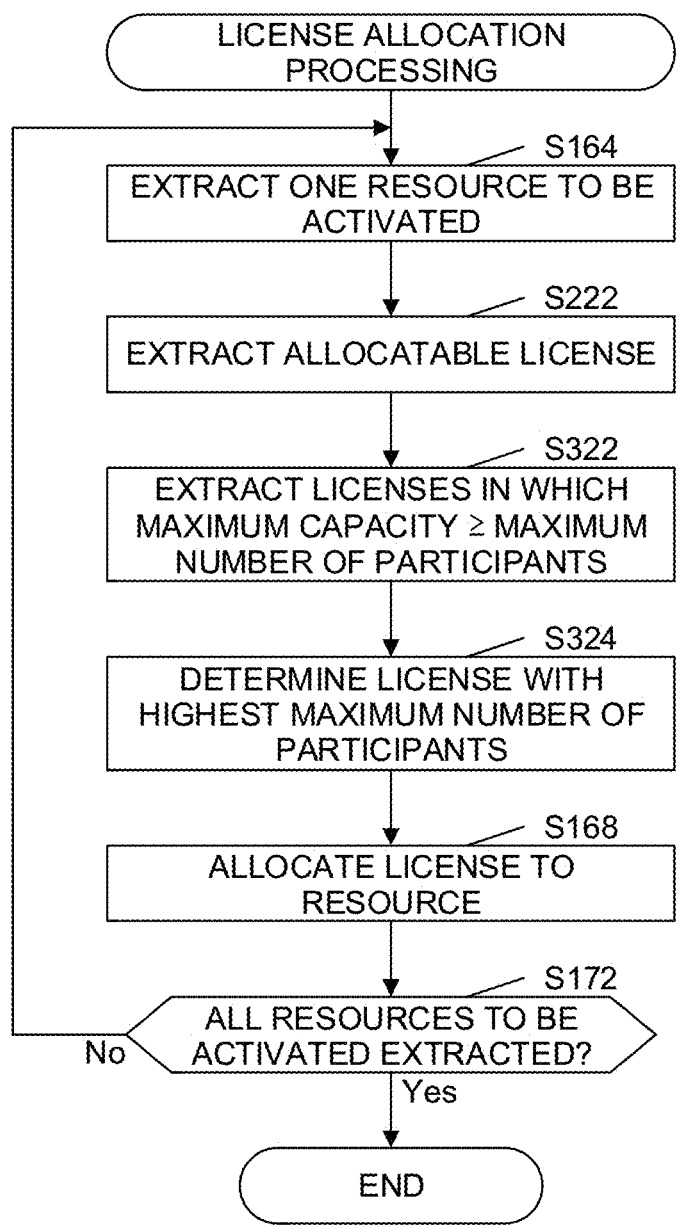
FIG. 23 is a flow diagram for describing the flow of license allocation processing in the third embodiment.

3.2.2 Method of Allocating Licenses with Maximum Number of Participants Less Than or Equal to Maximum Capacity The license allocator 104 executes processing having a modification to part of the license allocation processing shown in FIG. 20. A detailed processing flow is shown in FIG. 23.

The license allocator 104 extracts one resource to be activated, extracts the licenses that can be allocated, and then extracts the licenses such that the maximum capacity is greater than or equal to the maximum number of participants (step S322). For example, the license allocator 104 calculates, for each set of license information stored in the license information storage area 124, a value obtained by subtracting the maximum number of participants stored in the license information from the maximum capacity stored in the license information of the license extracted in step S164. Then the license allocator 104 extracts license information in which the calculated value is 0 or more.

Then, the license allocator 104 determines the license having the largest maximum number of participants among the licenses extracted in step S322 (step S324). Further, the license allocator 104 allocates the license determined in step S364 to the resource extracted in step S164 (step S168).

As a result of the processing described above, the license allocator 104 allocates to the resource the license with the largest maximum number of participants among the licenses that can be allocated to the maximum capacity of the conference room. Therefore, a license that matches the maximum capacity can be allocated.

Generally, the cost of a license increases as the number of people capable of using the resources, such as the maximum number of participants, increases. According to the present embodiment, the license allocator 104 of the resource management server 10 is capable of allocating a license which matches the maximum capacity of the conference room. Further, if the licenses are allocated all at once, it is possible for the user to avoid incurring excessive costs.

According to the present embodiment, the resource management server is capable of allocating an appropriate license to a resource based on information about the number of people.

4. Fourth Embodiment

Next, a fourth embodiment will be described. Unlike the first embodiment, the fourth embodiment is an embodiment in which the resource management server allocates an appropriate license to a resource which is selected from a fixed rate license or a variable rate license based on a resource usage record. The description of the fourth embodiment will mainly describe the aspects that are different from the first embodiment.

4.1 Functional Configuration

Figure 24:
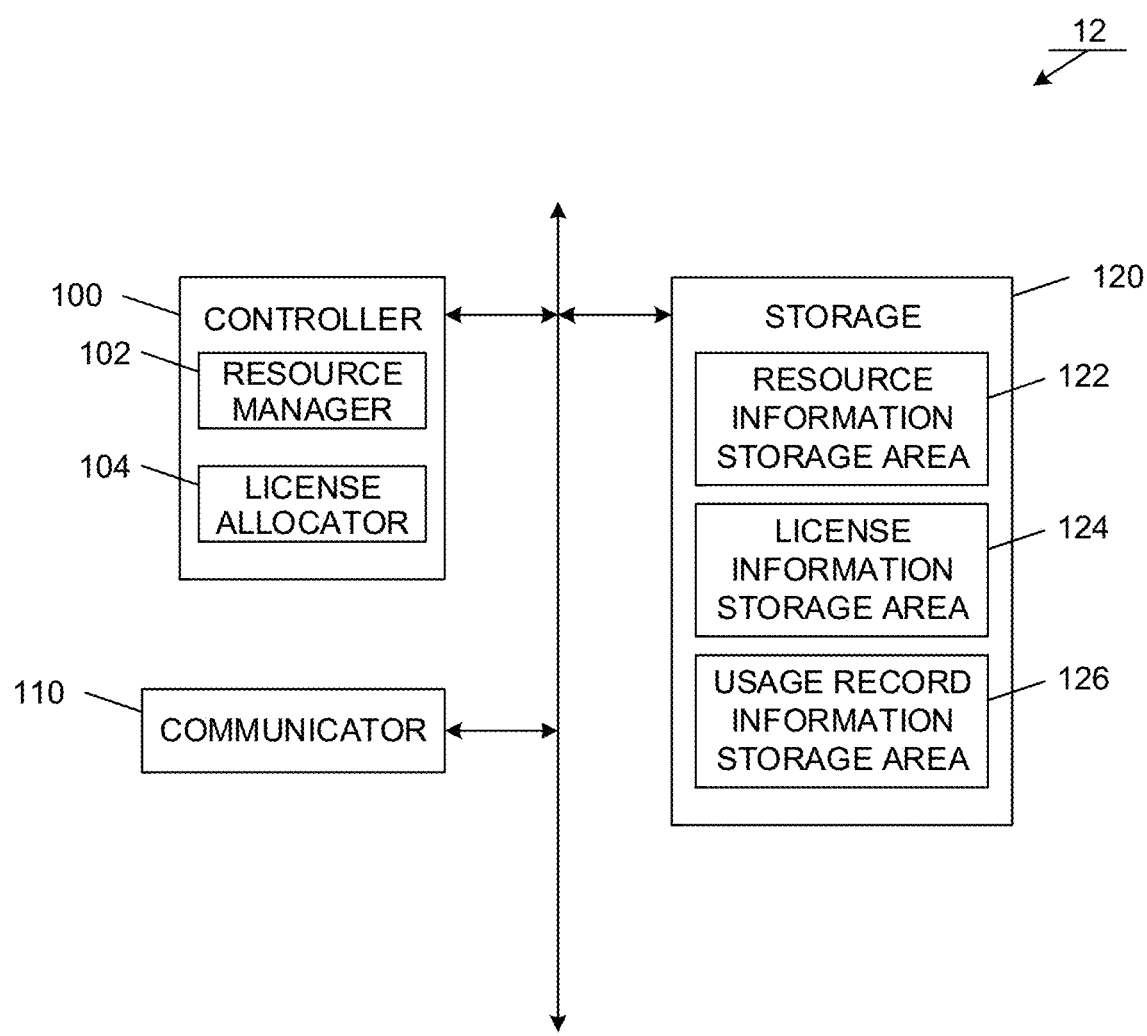
FIG. 24 is a functional block diagram for describing a functional configuration of a resource management server in a fourth embodiment.

A functional configuration of the resource management server 12 of the present embodiment is shown in FIG. 24. The resource management server 12 of the present embodiment differs from the resource management server 10 of the present embodiment in that a usage record information storage area 126 is further provided in the storage 120.

Next, the license information of the present embodiment will be described with reference to FIG. 25. In the present embodiment, the attributes stored in the license information are the number of licenses, the fee structure, and the expiration date. As shown in FIG. 25, the fee structure stores whether the license has a fixed rate or a variable rate, and information relating to the fee for using the resource.

In the present embodiment, a fixed rate license refers to a license that generates a fixed fee over a predetermined period (for example, one month), irrespective of usage frequency or duration of the resource by the user. For example, in FIG. 25, the license having the license ID "L2" indicates that it is a license that generates a fee of 120,000 yen per month, irrespective of the usage frequency or duration of the resource. On the other hand, a variable rate license refers to a license that generates a fee corresponding to the usage frequency or duration of the resource. For example, in FIG. 25, the license having the license ID "L1" indicates that it is a license that generates a fee of 9,000 yen per hour of usage duration of the resource.

Next, the usage record information stored in the usage record information storage area 126 of the present embodiment will be described with reference to FIG. 26. In the present embodiment, a usage record refers to a cumulative value of the usage frequency or usage duration of a resource in a predetermined period. Furthermore, the information relating to the usage record is referred to as usage record information.

The usage record information storage area 126 is an area that stores usage record information. For example, as shown in FIG. 26, the usage record information storage area 126 stores, as usage record information, a resource ID (for example, "R1") that identifies the resource, a previous usage period (for example, Jul. 2, 2019, 13:00 to 15:00), a previous usage duration (for example, "2 hours"), a cumulative usage frequency (for example, 3 times") that indicates the usage frequency of the resource over the cumulative aggregation period, a cumulative usage duration (for example, "6 hours") that indicates a cumulative value of the usage duration of the resource over the cumulative aggregation period, and the cumulative aggregation period (for example, Jul. 1, 2019 to Jul. 31, 2019).

The cumulative aggregation period is the period over which the past usage duration and usage frequency of the resource are aggregated. The cumulative aggregation period is, for example, a one-month period from the start to the end of the current month. The length of the cumulative aggregation period and the start date and end date of the cumulative aggregation period are, for example, set by the tenant business operator or administrator. Note that the cumulative aggregation period may be a past period such as the previous month.

Furthermore, the resource management server 12 stores the usage record information based on information which includes, for example, the resource usage periods transmitted from a terminal device provided in the conference room serving as the resource, or from a server that stores the usage record of the resource. In this case, the resource management server 12 stores the received usage period information as the previous usage period in the usage record information for the corresponding resource. Furthermore, the resource management server 12 calculates the previous usage duration based on the usage period information, and respectively stores the calculated value as the previous usage duration, the cumulative usage duration as the time obtained after adding the previous usage duration to the cumulative usage duration, and the cumulative usage frequency as the value obtained after adding 1 to the cumulative usage frequency.

4.2 Processing Flow

Next, the license allocation processing executed by the resource management server 12 in the present embodiment will be described with reference to FIG. 27.

First, the license allocator 104 extracts one resource to be activated, and extracts the usage record information of the extracted resource from the usage record information storage area 126 (step S164→step S402).

Then, the license allocator 104 determines whether or not the usage record of the resource during the cumulative aggregation period is a predetermined value or more (step S404). The predetermined value is a usage frequency or a usage duration, and is a value which is determined in advance, or is set by the tenant business operator or administrator. Specifically, frequencies such as 4 times, and durations such as 20 hours are respectively stored as predetermined values in the storage 120. If the usage frequency is stored as the predetermined value, the license allocator 104 compares the cumulative usage frequency stored in the usage record information extracted in step S402 with the predetermined value. Furthermore, if the usage duration is stored as the predetermined value, the license allocator 104 compares the cumulative usage duration stored in the usage record information extracted in step S402 with the predetermined value.

If the usage record of the resource over the cumulative aggregation period is the predetermined value or more, the license allocator 104 extracts license information that stores fee information relating to a fixed rate structure from the license information storage area 124 (step S404; Yes→step S406). On the other hand, if the usage record of the resource over the predetermined period is less than the predetermined value, the license allocator 104 extracts license information that stores fee information relating to a variable rate structure from the license information storage area 124 (step S404; No→step S408). Furthermore, in step S404 and step S406, the license allocator 104 allocates a license that satisfies the conditions described in step S166 of the first embodiment. If a license that does not satisfy the conditions is extracted, the license allocator 104 extracts another license.

The license allocator 104 compares the usage record of the resource over the predetermined period with the predetermined value. If the predetermined period is one month and the predetermined value is a frequency, the license allocator 104 calculates the usage frequency of the resource over the most recent month based on the usage record information, and compares the frequency with the predetermined value. In this case, if the usage frequency of the resource over the most recent month is the predetermined value or more, the license allocator 104 extracts fixed rate license information. Note that, in step S406 or step S408, the license allocator 104 may extract, among the licenses that can be allocated, the license information of the license having the lowest cost.

Then, the license allocator 104 allocates the license extracted in step S406 or step S408 to the resource extracted in step S168 (step S168).

Note that, in the present embodiment, the license allocator 104 determines whether a fixed rate or variable rate license is allocated by comparing the usage record with a predetermined value. However, another method may be used. For example, the license allocator 104 may calculate the fee according to the fee structure of each license based on the usage record over a predetermined period (for example, the most recent month), and allocate the license with the lowest fee.

As described above, in the present embodiment, the resource management server is capable of allocating, based on the usage record of a resource, a fixed rate license to a conference room with a frequent usage record, and a variable rate license to a conference room that is infrequently used. Therefore, the resource management server is capable of reducing costs incurred by the user when using a resource.

5. Fifth Embodiment

Next, a fifth embodiment will be described. The fifth embodiment is an embodiment in which, in the license allocation processing, licenses are allocated to the resources to be activated from among all of the licenses, including those that have already been allocated.

The present embodiment is also applicable to the first embodiment to the fourth embodiment, which have already been described. When the license allocator 104 extracts the licenses to be allocated to the resources, it includes the number of licenses that have already been allocated to resources when extracting the licenses indicated by the number of licenses.

Figure 27:
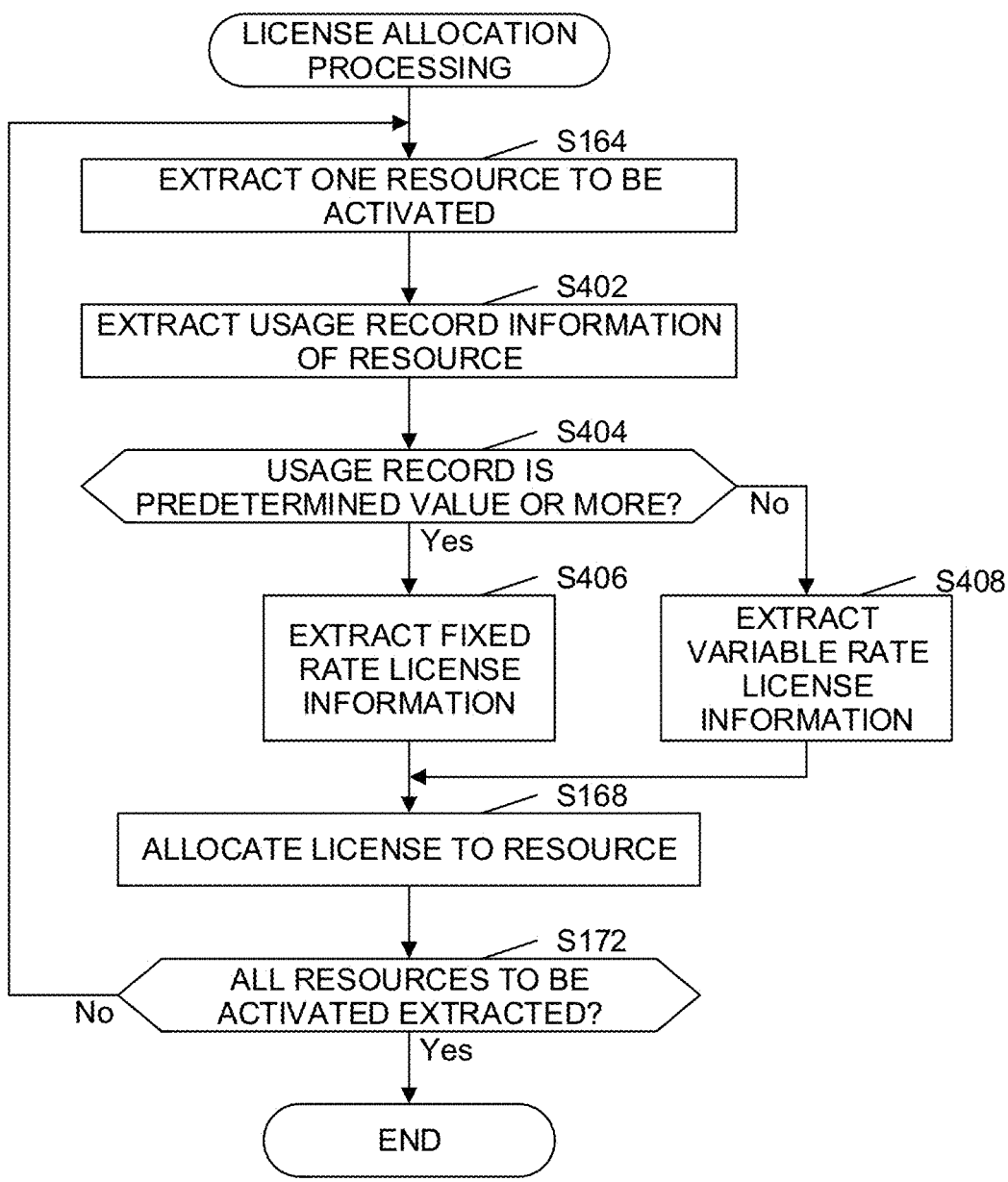
FIG. 27 is a flow diagram for describing the flow of license allocation processing in the fourth embodiment.

Specifically, in step S166 of FIG. 9 and FIG. 18, step S222 of FIG. 20 and FIG. 23, and step S406 and step S408 of FIG. 27, the condition that the license is unable to be allocated to the number of resources indicated by the number of licenses is excluded.

If the license allocator 104 extracts a license which is already allocated, but the license is unable to be allocated to another resource, it does not have to allocate the license to the resource to be activated. Furthermore, the license allocator 104 may notify the management terminal device 30 that there is an insufficient number of licenses that can be allocated to resources.

According to the present embodiment, the resource management server is capable of allocating an appropriate license from among all of the licenses.

6. Sixth Embodiment

Next, a sixth embodiment will be described. The sixth embodiment is an embodiment in which the resource management server allocates licenses to the resources according to the display order of the resources in the list display of the resources.

The present embodiment is also applicable to the first embodiment to the fourth embodiment, which have already been described. However, a case where it is applied to the first embodiment will be described below. The description of the sixth embodiment will mainly describe the aspects that are different from the first embodiment.

The resource information of the present embodiment will be described with reference to FIG. 28. In the present embodiment, the resource information stores, in addition to the resource ID, the attributes, and the license ID, a display order (for example, "1") indicating the display ranking of the resource information in the list display of the resources.

Figure 29:
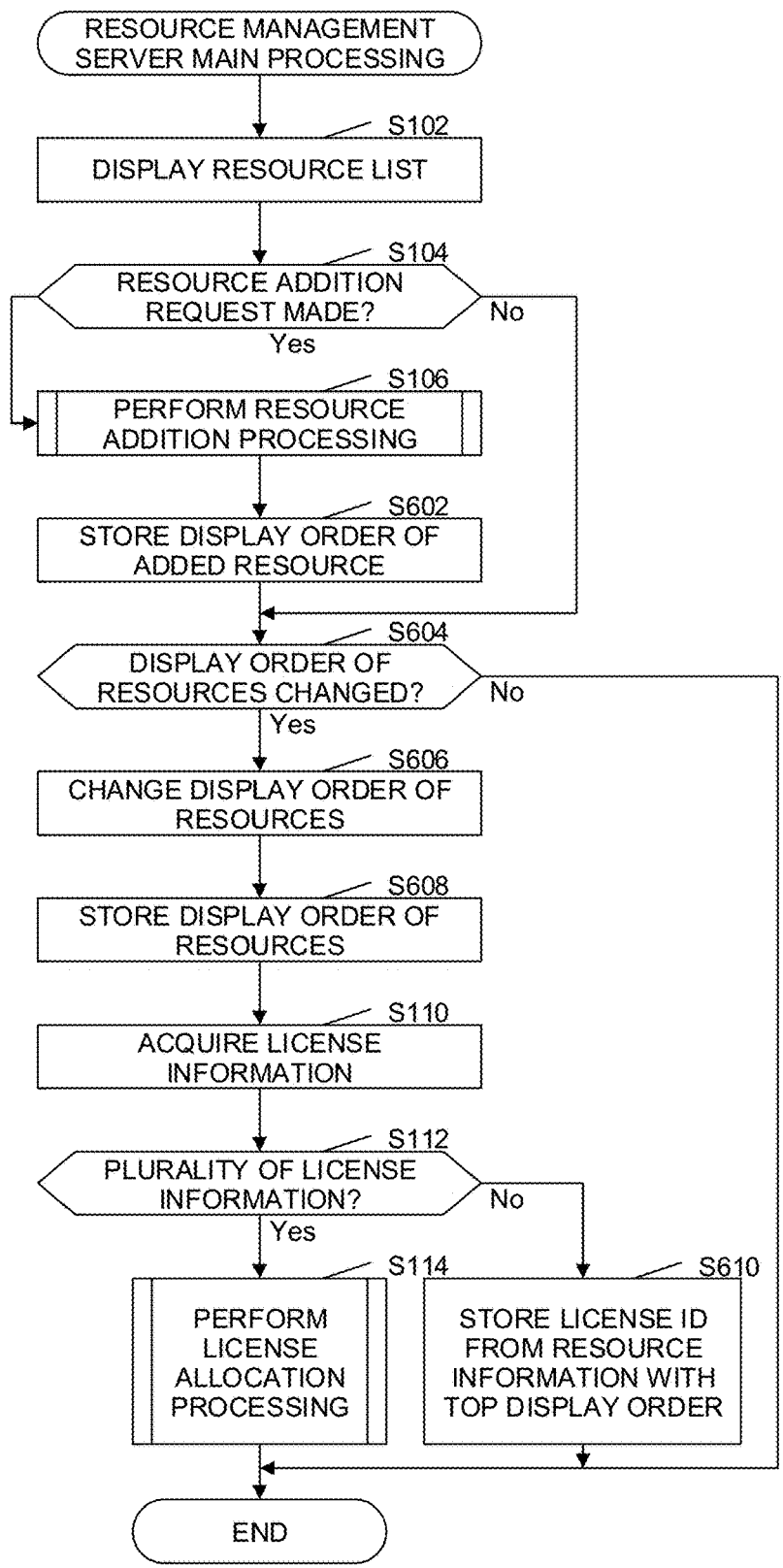
FIG. 29 is a flow diagram for describing the flow of main processing in a resource management server in the sixth embodiment.

Next, the main processing in the resource management server 10 of the present embodiment will be described with reference to FIG. 29. In the present embodiment, after adding the resource in step S106, the controller 100 stores the display order in the resource information of the added resource (step S602). For example, the controller 100 stores as the display order a value obtained by adding 1 to the largest value of the display order among the resource information stored in the resource information storage area 122. As a result, the newly added resource is displayed in the lowest position of the list display of the resources.

Furthermore, the controller 100 determines whether or not the display order of the resources displayed in the list of step S102 has been changed (step S604). For example, the controller 100 determines that an operation that changes the display order of the resources has been performed when information is received from the management terminal device 30 which indicates that the display order of the resources has been changed. The information indicating that the display order of the resources has been changed is, for example, information that enables the resource whose display order has been changed and the changed display order of the resources to be specified.

If the display order of the resources has been changed, the controller 100 changes the display order of the resources (step S606). For example, the controller 100 changes the order in which the resource information transmitted to the management terminal device 30 in step S604 is arranged based on the information indicating that the display order of the resources has been changed. For example, the controller 100 arranges the resource information in the display order, and then arranges the resource information in the changed display order by inserting the resource information of the resource whose display order has been changed into the position in the changed display order. In this way, the controller 100 is able to acquire the display order of the resources after the display order has been changed based on the order of the resource information.

Next, the controller 100 stores, based on the display order of the resources changed in step S606, the display order for each resource in the resource information (step S608). In this way, the display order after the change in the display order is stored in the display order of the resource information.

Figure 30:
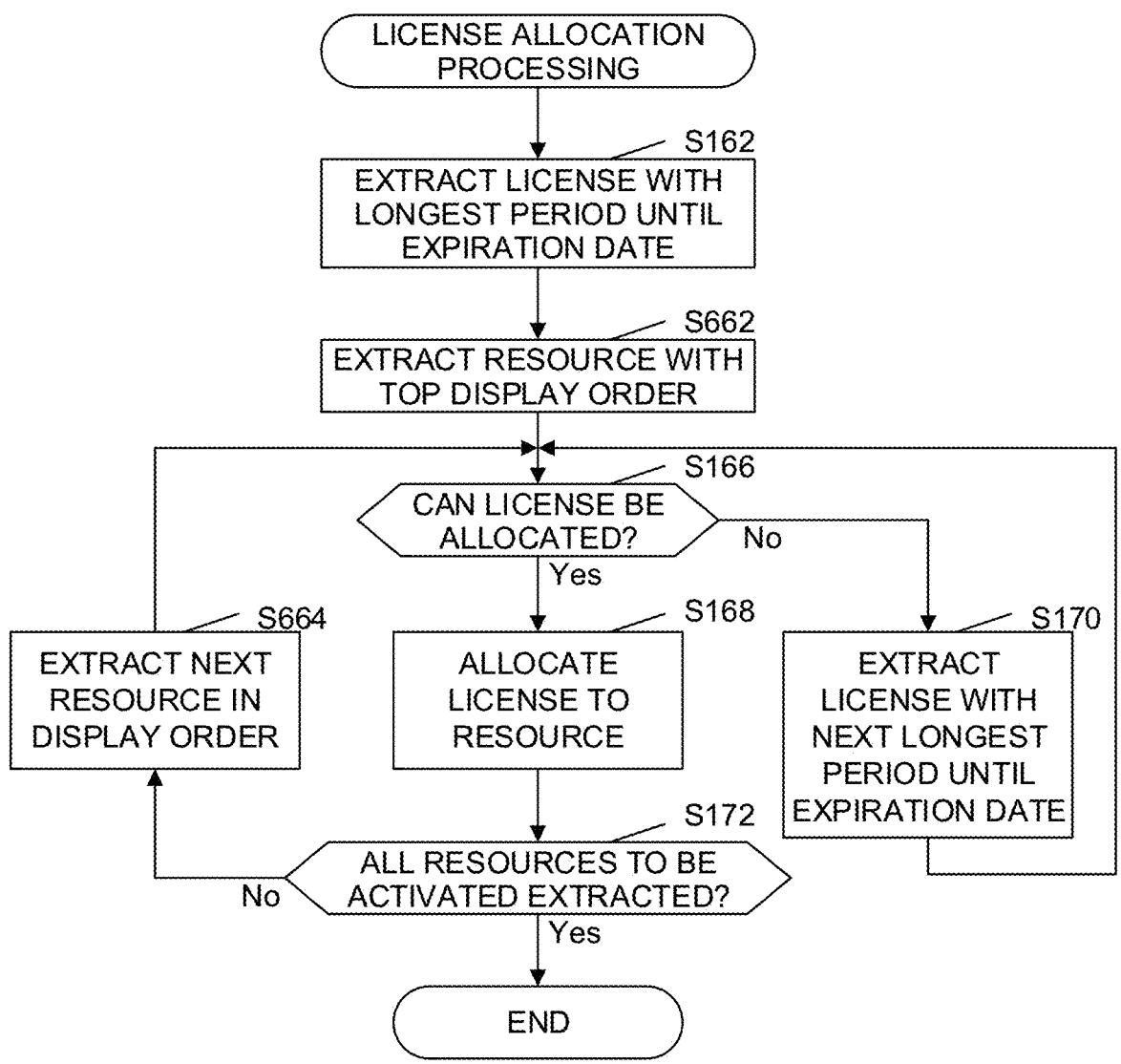
FIG. 30 is a flow diagram for describing the flow of license allocation processing in the sixth embodiment.

Furthermore, if a plurality of sets of license information was acquired from the license management server 20, the license allocator 104 performs license allocation processing (step S112; Yes→step S114). The license allocation processing of the present embodiment will be described with reference to FIG. 30.

In the present embodiment, the license allocator 104 extracts the license having the longest period until the expiration date, and extracts the resource information at the top of the display order from the resource information storage area 122 (step S162→step S662).

Furthermore, if all the resources to be activated have not been extracted, the license allocator 104 extracts the next resource in the display order, and returns to step S166 (step S172; No→step S664).

As a result of the processing described above, the license allocator 104 is capable of allocating licenses from the resource at the top of the display order.

When the processing is applied to the other embodiments, the license allocator 104 extracts the resource at the top of the display order in step S164 of FIG. 20 of the second embodiment, FIG. 23 of the third embodiment, and FIG. 27 of the fourth embodiment. Furthermore, if all the resources to be activated have not been extracted, the license allocator 104 extracts the next resource in the display order, and returns to step S164 (step S172; No→step S164).

The license allocator 104 may end the license allocation processing before all the resource information has been extracted if there are no licenses that can be allocated.

Furthermore, if a plurality of sets of license information has not been acquired in step S112, the controller 100 stores the license ID of the acquired license information in the resource information, starting from the top of the display order (step S112; No→step S610).

Next, an operation example of the present embodiment will be described with reference to the drawings. In the present embodiment, a case will be described where a certain tenant has five conference rooms, and the total number of licenses issued to the tenant is four.

Figure 31:
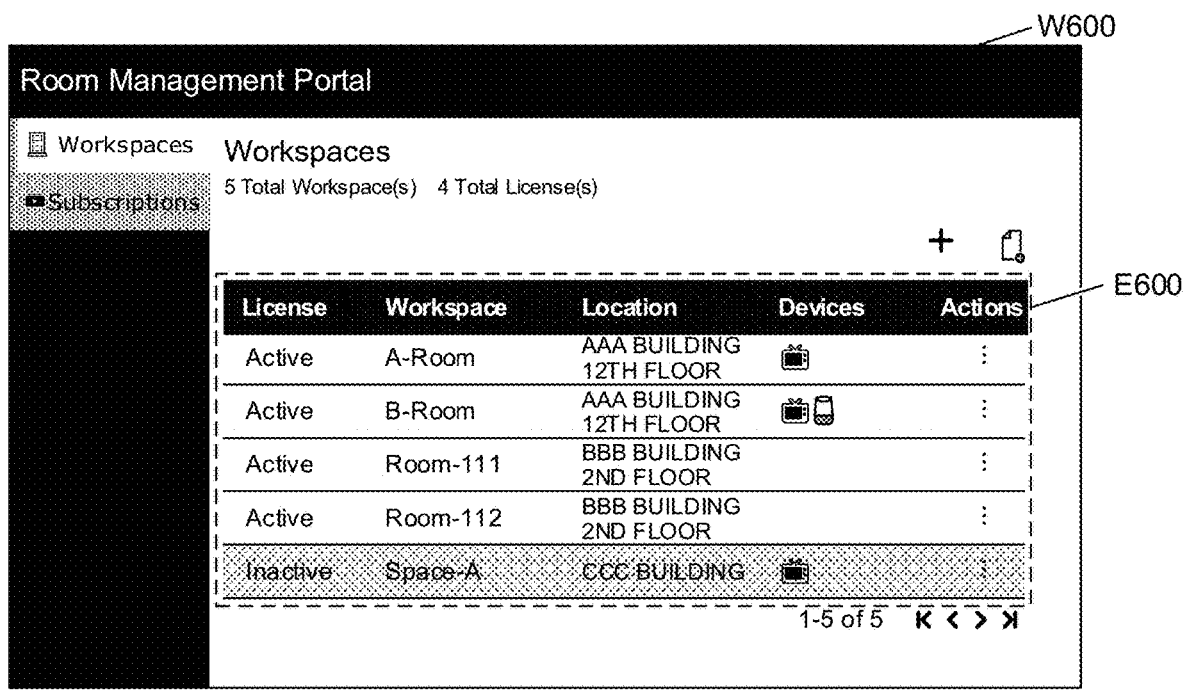
FIG. 31 is a diagram showing an operation example in the sixth embodiment.

FIG. 31 is an example of a display screen W600 displayed on the display unit 320 when the user uses the management terminal device 30 to connect to the resource management server 10. The display screen W600 includes an area E600 that displays a resource list, and discriminatively displays the top four resources in the display order to indicate that they are active resources.

FIG. 32A is an example of a display screen W610 displayed on the display unit 320 when the resource that is fifth from the top of the display order is being moved between the resource that is third from the top of the display order and the resource that is fourth from the top of the display order by means of a mouse drag operation. When the user performs a mouse drop operation in this state, the display order of the resources is changed, such that the display order of the resource that was fifth from the top of the display order before the change is now fourth from the top of the display order, and the display order of the resource that was fourth from the top of the display order before the change is now fifth from the top of the display order. Note that the operation to change the display order does not have to be a mouse drag operation. For example, it may be an operation that selects a button that raises or lowers the priority of the selected resource.

When a drop operation is performed in the state shown in FIG. 32A, the management terminal device 30 transmits information to the resource management server 10 indicating that the display order of the resources has been changed. The resource management server 10 changes the display order of the resources and then stores the changed display order in the resource information. As a result, before the display order is changed, the display order of the resource that was displayed fourth from the top is changed and displayed fifth from the top.

Furthermore, the resource management server 10 allocates licenses to the resources based on the changed display order. Here, because the total number of licenses is four, a license is allocated to the resource whose display order has been changed from fifth to fourth from the top. Further, the license is removed from the resource whose display order has been changed from fourth to fifth from the top. As a result, the display screen W620 shown in FIG. 32B is displayed on the display unit 320.

As described above, in the present embodiment, even when there is a plurality of licenses, the resource management server is capable of allocating licenses to resources based on the display order of the resources. Furthermore, the resource management server allows the user to change the display order of the resources, thereby allowing the user to specify the resources to be activated and specify the resources to which licenses are preferentially allocated.

7. Modifications

The present invention is not limited to the embodiments described above, and various changes may be made. That is to say, embodiments obtained by combining technical means appropriately changed without departing from the scope of the present invention are also included in the technical scope of the present invention.

Further, the resource management server of the present invention may be arranged in the cloud. As a result, the functions realized by the resource management server of the present invention can be provided as a service.

Furthermore, the embodiments described above have portions described separately for convenience of description. It is needless to say that they may be combined within a technically possible range.

Furthermore, in the embodiments, the program that operates in each device is a program that controls a CPU or the like (a program that causes a computer to function) so as to realize the functions of the embodiments described above. Further, the information handled by these devices is temporarily stored in a temporary storage device (such as a RAM) at the time of processing, and subsequently stored in storage devices such as various read only memory (ROMS) and HDDs. Then, the information is read, corrected, and written as necessary by the CPU.

Here, the recording medium that stores the program may be any of a semiconductor medium (such as a ROM or a non-volatile memory card), an optical recording medium or magneto-optical recording medium (such as a digital versatile disc (DVD), an magneto-optical disc (MO), a MiniDisc (MD), a compact disc (CD), or a Blu-ray disc (BD, registered trademark), a magnetic recording medium (such as a magnetic tape or a flexible disk), and the like. Furthermore, in addition to reading and executing the program to realize the functions of the embodiments described above, the functions of the present invention can sometimes be realized by joint processing between an operating system or other application programs based on the instructions from the program.

When distributed in the market, the program can be stored and distributed in a portable recording medium, or transferred to a server computer connected via a network such as the Internet. In this case, it is needless to say that the storage device of the server computer is included in the present invention.

BRIEF DESCRIPTION OF THE REFERENCE SYMBOLS

1 System
10, 12, Resource management server
  100 Controller
  102 Resource manager
  104 License allocator
  110 Communicator
  120 Storage
  122 Resource information storage area
  124 License information storage area
126 Usage record information storage area
20 License management server
  200 Controller
  202 License manager
  210 Communicator
  220 Storage
  222 License information storage area
30 Management terminal device
  300 Controller
  310 Communicator
  320 Display unit
  330 Operation input unit
  340 Storage

What is claimed is:

1. A resource management server comprising:
a controller;
a communicator;
a storage,
a non-transitory memory containing instructions when executed by the controller causes the controller to perform the steps of:
acquiring, by the controller, resource information about a resource to be activated;
storing, by the storage, the acquired resource information;
acquiring, by the controller, the stored resource information;
wherein the acquired stored resource is to be activated;
receiving, by the communicator, the resource to be activated;
wherein the resource has also been selected by a user;
requesting, by the communicator, a set of license information corresponding to the resource to be activated from a license management server other than the resource management server;
determining, by the controller, that the set of license information corresponding to the resource to be activated from a license management server has been acquired;
based on a determination, by the controller, that the set of a plurality of sets of license information has been acquired, extracting, one license information from the plurality of sets of license information based on a priority of an attribute of the plurality of sets of license information; and
allocating, by the controller, the extracted license information to the stored resource information.

2. The resource management server according to claim 1, wherein
the attribute is a license purchase date, and
the priority is an earliest date.

3. The resource management server according to claim 1, wherein
the attribute is a license expiration date, and
the priority is a longest period.

4. The resource management server according to claim 1, wherein
the attribute is a number of available devices of the license, and
the priority is a largest number.

5. The resource management server according to claim 1, wherein
the resource information includes device information of a device relating to the resource,
the attribute is a degree of matching between the device relating to the resource and an available device, and
the priority is a largest degree.

6. The resource management server according to claim 1, wherein
the attribute is a maximum number of participants of the license, and
the priority is a largest number.

7. The resource management server according to claim 1, wherein
the resource information includes information about a maximum capacity,
the attribute is a maximum number of participants within the maximum capacity, the maximum number of participants being less than or equal to the maximum capacity, and
the priority is a largest number.

8. The resource management server according to claim 1, wherein
the resource information includes resource usage record information,
the attribute is fee information relating to either a fixed rate structure or a variable rate structure, and
the priority is a fixed rate structure if the usage record of the resource is greater than or equal to a predetermined value, and is a variable rate structure if the usage record of the resource is less than the predetermined value.

9. The resource management server according to claim 1, wherein
the controller allocates, from all of the acquired licenses including licenses that have already been allocated, a license to the resource to be activated based on the plurality of sets of license information.

10. The resource management server according to claim 1, wherein
the controller:
performs control to display the resource information acquired; and
activates displayed resources, starting from a top displayed resource, based on the license information.

11. The resource management server according to claim 1, wherein
the resource includes a conference room.

12. A control method for a resource management server including a controller, a communicator, and a non-transitory storage that stores resource information, the control method comprising:

acquiring, by the controller, resource information about a resource to be activated;

storing, by the storage, the acquired resource information;

acquiring, by the controller, the stored resource information;

wherein the acquired stored resource is to be activated;

receiving, by the communicator, the resource to be activated;

wherein the resource has also been selected by a user;

requesting, by the communicator, a set of license information corresponding to the resource to be activated from a license management server other than the resource management server;

determining, by the controller, that the set of license information corresponding to the resource to be activated from a license management server has been acquired;

based on a determination, by the controller, that the set of a plurality of sets of license information has been acquired, extracting, one license information from the plurality of sets of license information based on a priority of an attribute of the plurality of sets of license information; and allocating, by the controller, the extracted license information to the stored resource information.

13. A non-transitory storage medium storing a program that is readable by a computer of a resource management server including a controller, a communicator, and a storage that stores resource information, when executed by the computer, causes the computer to perform the steps of:

acquiring, by the controller, resource information about a resource to be activated;

storing, by the storage, the acquired resource information;

acquiring, by the controller, the stored resource information;

wherein the acquired stored resource is to be activated;

receiving, by the communicator, the resource to be activated;

wherein the resource has also been selected by a user;

requesting, by the communicator, a set of license information corresponding to the resource to be activated from a license management server other than the resource management server;

determining, by the controller, that the set of license information corresponding to the resource to be activated from a license management server has been acquired;

based on a determination, by the controller, that the set of a plurality of sets of license information has been acquired, extracting, one license information from the plurality of sets of license information based on a priority of an attribute of the plurality of sets of license information; and allocating, by the controller, the extracted license information to the stored resource information.

* * * * *